United States Patent
Goto et al.

(10) Patent No.: US 6,479,796 B2
(45) Date of Patent: Nov. 12, 2002

(54) FLUX-CORED WIRE FOR GAS-SHIELDED ARC WELDING OF HEAT RESISTING STEEL

(75) Inventors: Akinobu Goto, Fujisawa (JP); Ken Yamashita, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 29 days.

(21) Appl. No.: 09/824,016

(22) Filed: Apr. 3, 2001

(65) Prior Publication Data

US 2002/0003135 A1 Jan. 10, 2002

(30) Foreign Application Priority Data

May 1, 2000 (JP) .................................. 2000-132798

(51) Int. Cl.[7] .............................................. B23K 35/02
(52) U.S. Cl. ........................... 219/145.22; 219/146.1; 219/146.23
(58) Field of Search ................... 219/145.22, 146.1, 219/146.23, 146.52; 148/23; 75/304

(56) References Cited

U.S. PATENT DOCUMENTS 4,465,921 A * 8/1984 Sakai et al. ............ 219/146.24
5,124,529 A * 6/1992 Nishikawa et al. ..... 219/146.22
5,430,269 A   7/1995 Natsume et al.
5,854,463 A * 12/1998 Yamashita et al. ..... 219/145.22
6,340,396 B1 * 1/2002 Ogawa et al. ............... 148/23

FOREIGN PATENT DOCUMENTS

| JP | 50-116351 | 9/1975 |
| JP | 59-44159  | 1/1983 |
| JP | 5-77086   | 3/1993 |
| JP | 8-13432   | 2/1996 |

* cited by examiner

Primary Examiner—M. Alexandra Elve
(74) Attorney, Agent, or Firm—Oblon, Spivak, McClelland, Maier & Neustadt, P.C.

(57) ABSTRACT

A flux-cored wire for gas-shielded arc welding of heat-resisting steel in the form of a steel tube filled with a flux, which is characterized in that the content of slag-forming agent is 6.10–9.90 mass % (based on the total mass of the wire), said steel tube and said flux all together contain less than 0.20 mass % C., 0.06–1.40 mass % Si, 0.55–1.60 mass % Mn, 0.004–0.090 mass % Cu, 0.004–0.090 mass % Ni, less than 2.60 mass % Cr, and 0.3–1.20 mass % Mo (based on the total mass of the wire), and said flux contains 4.2–8.2 mass % $TiO_2$, 0.025–0.25 mass % of metal fluoride (in terms of fluorine), and 0.20–1.50 mass % Mg. The flux-cored wire has both good welding maneuverability and ability to give weld metal with good mechanical properties, such as strength and toughness.

3 Claims, 1 Drawing Sheet

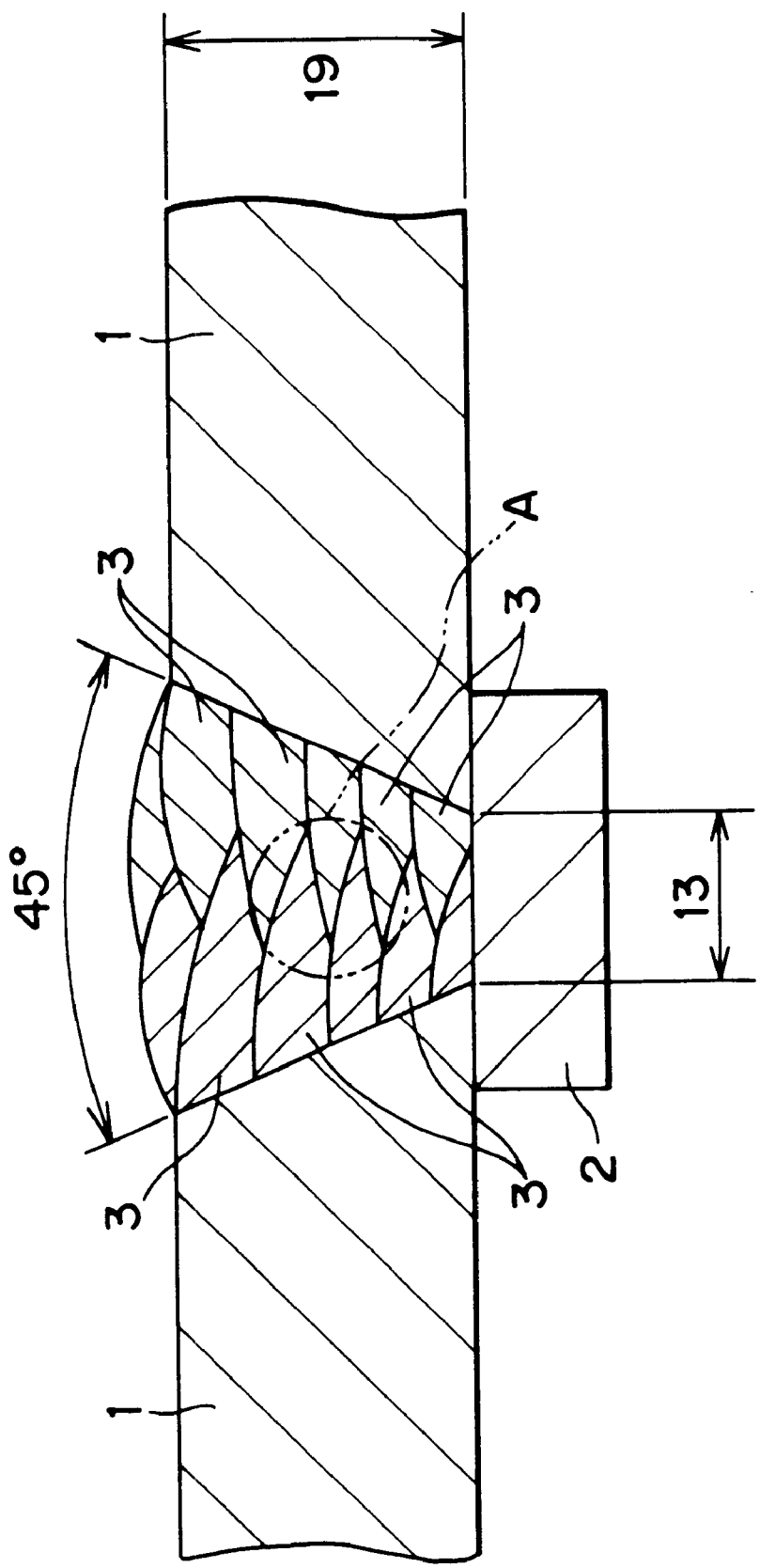

FLUX-CORED WIRE FOR GAS-SHIELDED ARC WELDING OF HEAT RESISTING STEEL

BACKGROUND OF THE INVENTION

1. Field of the Invention

The present invention relates to a flux-cored wire for gas-shielded arc welding of heat resisting steel. More particularly, the present invention relates to a flux-cored wire for gas-shielded arc welding of heat resisting steel which is easy to work and gives weld metal having good mechanical properties such as strength and toughness. The flux-cored wire corresponds to YFM-C, YFCM-C, YF1CM-C, and YF2CM-C specified in JIS Z3318-1991 (flux-cored wire for MAG welding of Mo steel and Cr-Mo steel) or corresponds to A1, A1M, B1, B1M, B1L, B1LM, B2, B2M, B2L, B2LM, B2H, B2HM, B3, B3M, B3L, B3LM, B3H, and B3HM specified in AWS A5.29-1998 (Specification for Low-Alloy Steel Electrodes for Flux-Cored Arc Welding).

The present invention relates also to a flux-cored wire for gas-shielded arc welding of Cr-Mo steel (represented by ASTM A387 Gr. 2, 11, 22) and Mo steel (represented by ASTM A204 Gr. A). To be concrete, the present invention relates to a flux-cored wire for gas-shielded arc welding of Cr-Mo steel containing 0.25–3.0 wt % Cr and 0.25–1.5 wt % Mo and Mo steel containing 0.25–1.0 wt % Mo.

2. Description of the Related Art

In the field of heat-resisting steel, gas-shielded arc welding is dominating over shielded metal arc welding because of its high efficiency. Wires for gas-shielded arc welding fall under two categories—solid wires and flux-cored wires. The latter have many advantages over the former. For example, flux-cored wires give rise to less spatter than solid wires and cover the bead surface with slag, producing a bead with a good appearance and shape. In addition, it ensures good welding maneuverability regardless of unfavorable welding positions, such as vertical and overhead positions. Unfortunately, as compared with solid wires, flux-cored wires are more likely to give weld metal poor in mechanical properties, particularly toughness. One reason for this is that in the case of welding with rutile-flux-cored steel wires, molten slag does not float on or separate from molten metal completely, partly remaining as non-metallic inclusions in weld metal, with the result that the oxygen content in weld metal becomes as high as 700–900 ppm (by mass).

A conventional way to cope with the deterioration of weld metal in toughness due to rutile-flux-cored steel wires is by deoxidation of weld metal or by refinement of microstructure.

For example, there is disclosed a new flux-cored wire for gas-shielded arc welding in Japanese Patent Publication No. 44159/1984. It is designed to reduce the oxygen content in weld metal by incorporation of Mg, metallic Ti, and Fe-Ti into the flux, thereby improving the toughness of weld metal.

There is also disclosed a combined wire for gas-shielded arc welding in Japanese Patent Publication No. 6840/1981. It is designed for deoxidation of weld metal and refinement of microstructure by controlling the amount of TiO, $TiO_2$, B, and $B_2O_3$ so that weld metal has good toughness ness even in the case of welding with a large amount of heat.

There is disclosed another flux-cored wire for gas-shielded arc welding in Japanese Patent Publication No. 13432/1996. It is characterized in that the metal tube and flux contain Ti, Ni, and B as well as a limited amount of nitrogen because it is known that nitrogen has an adverse effect on toughness.

There is disclosed further another flux-cored wire in Japanese Patent Publication No. 13432/1996 and Japanese Patent Laid-open No. 77086/1993. It contains a trace amount of Nb and V so as to prevent the occurrence of coarse ferrite particles and ferrite band having an adverse effect on strength and toughness.

The disadvantage of the flux-cored wire disclosed in Japanese Patent Publication No. 44159/1984 is that mere incorporation with Mg and Ti does not reduce oxygen content in weld metal and hence does not improve the toughness of weld metal through reduction of oxygen content. It has another serious disadvantage of causing slag inclusion, more spatter, and poor bead shape in welding.

The combined wire disclosed in Japanese Patent Publication No. 6840/1981 has a disadvantage of being unable to reconcile welding maneuverability with weld metal having good mechanical properties as in the case of flux-cored wire disclosed in Japanese Patent Publication No. 44159/1984.

The flux-cored wire disclosed in Japanese Patent Publication No. 13432/1996 inevitably causes air inclusion as wire extension varies during welding. Air inclusion results in an increase in nitrogen content in weld metal, with no noticeable improvement in toughness and electrode usability.

The flux-cored wire disclosed in Japanese Patent Publication No. 13432/1996 and Japanese Patent Laid-open No. 77086/1993 effectively prevents the occurrence of ferrite particles and ferrite band owing to a trace amount of Nb and V contained therein. However, mere incorporation with Nb and V is not enough to improve strength and toughness. Moreover, incorporation with Nb and V makes slag removal difficult. Hence, it does not achieve compatibility between welding maneuverability and weld metal having good mechanical properties as intended in the present invention.

OBJECT AND SUMMARY OF THE INVENTION

The present invention was completed to address the above-mentioned problems. It is an object of the present invention to provide a flux-cored wire for gas-shielded arc welding of heat resisting steel which offers good welding maneuverability and gives weld metal having good mechanical properties.

BRIEF DESCRIPTION OF THE DRAWINGS

FIG. 1 is a sectional view showing a test plate produced in an example of the present invention.

DESCRIPTION OF THE PREFERRED EMBODIMENTS

The present invention is directed to a flux-cored wire for gas-shielded arc welding of heat-resisting steel in the form of a steel tube filled with a flux, which is characterized in that the content of slag-forming agent is 6.10–9.90 mass % (based on the total mass of the wire), said steel tube and said flux all together contain less than 0.20 mass % C., 0.06–1.40 mass % Si, 0.55–1.60 mass % Mn, 0.004–0.090 mass % Cu, 0.004–0.090 mass % Ni, less than 2.60 mass % Cr, and 0.3–1.20 mass % Mo (based on the total mass of the wire), and said flux contains 4.2–8.2 mass % $TiO_2$, 0.025–0.25 mass % of metal fluoride (in terms of fluorine), and 0.20–1.50 mass % Mg.

According to a preferred embodiment for improved toughness, said steel tube and said flux all together further contain 0.005–0.050 mass % Nb, 0.005–0.050 mass % V, and 0.005–0.020 mass % B, (based on the total mass of the wire), and said steel tube and said flux contain less than 0.015 mass % P and less than 0.015 mass % S.

According to another preferred embodiment for improved toughness, said steel tube and said flux all together further contain 0.02–0.2 mass % Ti (based on the total mass of the wire).

A detailed description of the invention follows. The present inventors carried out extensive studies on how the bead shape is affected by welding maneuverability, particularly welding position such as vertical or overhead welding. It was found that a good bead shape depends on both molten metal and slag. In other words, a good bead shape cannot be obtained only by adjusting the viscosity of molten metal or only by changing the amount or constituents of slag. This finding suggests the following to obtain a good bead shape.
(1) Adjustment of the viscosity and flowability of molten metal by means of Si, Mn, and Mg.
(2) Optimization of the viscosity and flowability of slag per se by adjusting the amount of slag, the amount of $TiO_2$ (as a major constituent), and the amount of fluoride.

It was found that if the above-mentioned two objects (1) and (2) are achieved simultaneously, a good bead shape is obtained regardless of unfavorable welding positions, such as vertical and overhead welding.

Next, the present inventors carried out extensive investigations on mechanical properties such as strength and toughness. It was found that not only Si, Mn, Mg, and fluorides but also C, Cr, and Mo affect mechanical properties and that Cu and Ni materially affect mechanical properties such as strength and toughness.

It was found that the arc stability affects the degree of segregation of deposited metal. That is, deposited metal resulting from a flux-cored wire (which lacks arc stability) is subject to segregation of alloy constituents. This segregation promotes the occurrence of ferrite band by post-weld heat treatment (PWHT), thereby deteriorating strength and toughness. Knowing that improvement in arc stability leads to improvement in mechanical properties of deposited metal, the present inventors carried out extensive investigations on the arc stabilizer. Thus, it was found that it is important to optimize the amount of $TiO_2$ (as a major arc stabilizer) and the amount of fluorides. If this object and the above-mentioned object (1) are achieved simultaneously, it is possible to reconcile welding maneuverability with weld metal having good mechanical properties as intended in the present invention.

According to the present invention, the flux-cored wire for gas-shielded arc welding of heat resisting steel contains several constituents in specific amounts. The reason for this is explained in the following.

Slag-forming Agent: 6.10–9.90 mass %

The term "slag-forming agent" as used in this specification denotes any non-metallic components, such as $TiO_2$ and fluorides, which characterize the present invention. It also embraces $Al_2O_3$, $ZrO_2$, $SiO_2$, CaO, and MgO which are intended for adjustment of the basicity of slag and for fine control of the melting point, viscosity, and flowability of slag. It also embraces $K_2O$, $Na_2O$, and $Li_2O$ which are intended for fine control of arc state. They produce synergistic effects with $TiO_2$, Si, Mn, Mg, and fluorides mentioned later, thereby giving rise to a good bead shape regardless of welding positions (such as down hand welding, horizontal fillet welding, vertical welding, and overhead welding). In addition, they give rise to sound weld metal. If the content of the slag-forming agent is less than 6.10 mass % of the total mass of the wire, the amount of slag is not enough to cover the bead surface and hence the resulting bead looks poor. Insufficient slag results in a remarkably convex bead in the case of vertical or overhead welding, presenting difficulties in welding operation. Insufficient slag also adversely affects slag removal, causing weld flaws such as slag inclusion and incomplete fusion. On the other hand, if the content of the slag-forming agent is more than 9.90 mass % of the total mass of the wire, slag constantly covers the molten pool, thereby causing weld flaws such as slag inclusion and incomplete fusion. Therefore, the adequate content of the slag-forming agent should be 6.10–9.90 mass % of the total mass of the wire.

C: Less Than 0.20 mass %

C is added to either or both of the metal tube and flux for weld metal to have controlled strength and toughness. If the total amount of C in the metal tube and flux exceeds 0.20 mass % of the total mass of the wire, weld metal has excessively high strength and extremely decreases in toughness and becomes liable to weld flaws such as hot cracking and blowhole. Therefore, an adequate content of C in the metal tube and flux should be less than 0.20 mass % of the total mass of the wire. Incidentally, C should be added to the flux in the form of simple substance (such as graphite) or alloy (such as chromium carbide, Si-C, high C—Fe—mn, and high C—Fe—Cr).

Si: 0.06–1.40 mass %

Si deoxidizes weld metal, thereby controlling its strength and toughness, and optimizes the amount of slag-forming agent. In addition, it adjusts the bead shape when added in combination with Mn, $TiO_2$, Mg, and fluorides. Therefore, Si should be added to either or both of the metal tube and flux. If the total content of Si in the metal tube and flux is less than 0.06 mass % of the total mass of the wire, Si does not fully produce its deoxidizing effect but causes weld flaws such as blowhole, resulting in weld metal lacking strength and toughness. With an insufficient amount of Si, molten metal lacks adequate viscosity, giving rise to a poor bead shape in the case of vertical or overhead welding. On the other hand, if the total amount of Si in the metal tube and flux exceeds 1.40 mass % of the total mass of the wire, Si coarsens ferrite particles in weld metal at the time of PWHT, thereby greatly deteriorating toughness. Therefore, the total amount of Si in the metal tube and flux should be 0.06–1.40 mass % of the total mass of the wire. If the total amount of Si in the metal tube and flux is more than 0.10 mass % of the total mass of the wire, Si produces a stable effect of deoxidizing weld metal and prevents variation in strength and toughness. Therefore, a preferred total amount of Si in the metal tube and flux should is 0.10–1.40 mass % of the total mass of the wire. Si should be added to flux in the form of alloy such as Fe—Si, Fe—Si—Mn, and Fe—Si—Cr.

Mn: 0.55–1.60 mass %

Mn deoxidizes weld metal, thereby controlling its strength and toughness, and optimizes the amount of slag-forming agent. In addition, it adjusts the bead shape when added in combination with Si, $TiO_2$, Mg, and fluorides. Therefore, Mn should be added to either or both of the metal tube and flux. If the total content of Mn in the metal tube and flux is less than 0.55 mass % of the total mass of the wire, Mn does not fully produce its deoxidizing effect but causes weld flaws such as blowhole, resulting in weld metal lacking strength and toughness. If the total content of Mn in the metal tube and flux exceeds 1.60 mass % of the total mass of the wire, Mn makes molten metal to have such an excessive fluidity that the bead shape is too poor to be practical in the case of unfavorable welding position such as vertical and overhead welding. Therefore, the total amount of Mn in the metal tube and flux should be 0.55–1.60 mass % of the total mass of the wire. If the total amount of Mn in the metal tube and flux is less than 1.45 mass % of the total mass of the wire, Mn contributes to a good bead shape. Therefore, a preferred total amount of Mn in the metal tube and flux should be 0.55–1.45 mass % of the total mass of the wire. Mn should be added to flux in the form of simple substance (metallic Mn) or alloy (such as Fe—Mn and Fe—Si—Mn).

Cu: 0.004–0.090 mass %, Ni: 0.004–0.090 mass %

Both Cu and Ni prevent weld metal from fluctuating in strength and toughness. They may be added to either or both of the metal tube and flux. If the total content of Cu or Ni in the metal tube and flux is less than 0.004 mass % of the total mass of the wire, they do not produce the effect of preventing weld metal from fluctuating in strength and toughness. On the other hand, if the total content of Cu or Ni in the metal tube and flux is more than 0.090 mass % of the total mass of the wire, they cause weld metal to decrease in strength. Therefore, the total amount of Cu in the metal tube and flux should be 0.004–0.090 mass % of the total mass of the wire, and the total amount of Ni in the metal tube and flux should be 0.004–0.090 mass % of the total mass of the wire. Cu or Ni should be added to flux in the form of simple substance (Cu metal or Ni metal) or in the form of alloy. In the case of seamless wire, Cu or Ni may be added in the form of plating for surface treatment.

Cr: Less Than 2.60 mass %, Mo: 0.30–1.20 mass %

Both Cr and Mo are added to either or both of the metal tube or flux so that weld metal has controlled strength and toughness. Mo increases the resistance to temper softening of weld metal and prevents it from decreasing in strength during PWHT. The amount of these components should be properly adjusted so that the weld metal has the same composition as the base metal to be welded. If the total content of Mo in the metal tube and flux is less than 0.30 mass % of the total mass of the wire, the resulting weld metal does not have sufficient strength and toughness. On the other hand, if the total content of Cr in the metal tube and flux is more than 2.60 mass % of the total mass of the wire, or if the total content of Mo in the metal tube and flux is more than 1.20 mass % of the total mass of the wire, the resulting weld metal has excessively high strength and has extremely poor toughness due to temper embrittlement. Therefore, the total amount of Cr in the metal tube and flux should be less than 2.60 mass % of the total mass of the wire, and the total amount of Mo in the metal tube and flux should be 0.30–1.20 mass % of the total mass of the wire. Cu or Ni should be added to flux in the form of simple substance (Cr metal or Mo metal) or in the form of alloy (such as Fe—Cr and Fe—Mo).

$TiO_2$: 4.2–8.2 mass %

$TiO_2$ is a major component of the slag-forming agent. It functions also as an arc stabilizer. In addition, it optimizes the amount of the slag-forming agent, and when added in combination with Si, Mn, Mg, and fluorides, it adjusts the bead shape. Therefore, $TiO_2$ should be added to flux. If the content of $TiO_2$ is less than 4.2 mass % of the total mass of the wire, the bead shape is poor and the arc stability deteriorates to increase spatter, making welding operation impracticable. On the other hand, if the content of $TiO_2$ is more than 8.2 mass % of the total mass of the wire, the slag viscosity becomes extremely high, causing weld flaws such as slag inclusion. Therefore, the content of $TiO_2$ should be 4.2–8.2 mass % of the total mass of the wire.

Metal Fluorides: 0.025–0.25 mass % in Terms of F

Metal fluorides function as an arc stabilizer. They also control the viscosity of molten slag and optimizes the amount of slag-forming agent. When added in combination with Si, Mn, $TiO_2$, and Mg, they adjust the bead shape. Moreover, they dissociate in an arc, thereby liberating fluorine gas which stirs molten metal. The stirring of molten metal promotes floating and separation of slag from molten metal and reduces the amount of oxygen in weld metal. For this reason, they are added to flux. With a content less than 0.025 mass % (in terms of fluorine) of the total mass of the wire, the metal fluorides do not produce the effect of adjusting the bead shape and reducing the amount of oxygen in weld metal. Moreover, metal fluorides in such a content aggravates arc stability, thereby increasing spatter and resulting in a poor bead shape, with the result that the weld metal is poor in toughness. On the other hand, with a content exceeding 0.25 mass % (in terms of fluorine) of the total mass of the wire, the metal fluorides make the slag excessively flowable, adversely affecting the ability of slag to cover molten metal, and aggravate the bead shape. Therefore, the content of metal fluorides should be 0.025–0.25 mass % (in terms of fluorine) of the total mass of the wire. Incidentally, the metal fluorides may be in the form of LiF, NaF, $K_2SiF_6$, $CaF_2$, $MgF_3$, $BaF_2$, or $CeF_3$.

Mg: 0.20–1.50 mass %

Mg is a strong deoxidizing agent, and it is added to flux to deoxidize weld metal, thereby improving weld metal in toughness. With a content less than 0.20 mass % of the total mass of the wire, Mg does not fully produce its de-oxidizing effect but causes blowhole and deteriorates toughness. On the other hand, with a content more than 1.50 mass % of the total mass of the wire, Mg increases the amount of spatter and make molten metal excessively flowable. Mg in such an amount extremely aggravates the bead shape in the case of vertical or overhead welding, even though it optimizes the amount of the slag-forming agent and the respective amounts of Si, Mn, $TiO_2$, Mg, and fluorides are within the range specified in the present invention. Therefore, the content of Mg should be 0.20–1.50 mass % of the total mass of the wire. Incidentally, Mg may be added in the form of simple substance (such as metallic Mg) or alloys (such as Al—Mg, Si—Mg, and Ni—Mg).

The foregoing is the fundamental feature of the present invention. Lack of any of such requirements would make it impossible to reconcile good welding maneuverability with weld metal having good mechanical properties such as strength and toughness. Incidentally, the following additional elements increase strength and toughness and ensure stabler strength and toughness.

Nb: 0.005–0.050 mass %, V: 0.005–0.050 mass %

Nb and V are strong carbide-forming elements. When added in an adequate amount, they fix C in the interface between one bead and the other, thereby preventing the coarsening of ferrite grains and the occurrence of ferrite band in weld metal during PWHT, which in turn prevents the deterioration of toughness. Therefore, they may be added to either or both of the metal tube and flux. If its total amount in the metal tube and flux is less than 0.005 mass % of the total mass of the wire, Nb does not produce its effect of preventing toughness from deteriorating. If its total amount in the metal tube and flux is less than 0.005 mass % of the total mass of the wire, V does not produce its effect of preventing toughness from deteriorating. on the other, if its total amount in the metal tube and flux is more than 0.050 mass % of the total mass of the wire, Nb does not produce any additional effect. If its total amount in the metal tube and flux is more than 0.050 mass % of the total mass of the wire, V does not produce any additional effect. Therefore, the total amount of Nb in the metal tube and flux should preferably be 0.005–0.050 mass % of the total mass of the wire. The total amount of V in the metal tube and flux should preferably be 0.005–0.050 mass % of the total mass of the wire. Incidentally, Nb and V may be added to flux in the form of simple substance or alloy (such as Fe—Nb and Fe—V) or as a trace component in a variety of oxides.

B: 0.005–0.020 mass %

B improves toughness through refinement of microstructure of weld metal. It may be added to either or both of the metal tube and flux. If its total content in the metal tube and flux is less than 0.005 mass % of the total mass of the wire, B will not fully produce its effect of improving toughness. If its total content in the metal tube and flux is more than 0.020 mass % of the total mass of the wire, B will not produce additional effect. Therefore, the total content of B in the metal tube and flux should be 0.005–0.020 mass % of the total mass of the wire. Incidentally, B may be added in the form of alloy (such as Fe—B and Fe—Si—B) or in the form of oxide (such as $B_2O_3$).

P: Less than 0.015 mass % (in Total Content)

S: Less than 0.015 mass % (in Total Content)

P and S make weld metal brittle during PWHT. Limiting their amount favorably stabilizes or improves the toughness of weld metal. Therefore, the total amount of P in the metal tube and flux should preferably be less than 0.015 mass % of the total mass of the wire. The total amount of S in the metal tube and flux should preferably be less than 0.015 mass % of the total mass of the wire.

Ti: 0.02–0.2 mass %

Ti is added to either or both of the metal tube and flux for arc stabilization and deoxidation of weld metal. If its total amount in the metal tube and flux is less than 0.02 mass % of the total mass of the wire, Ti does not fully produce its effect of arc stabilization and deoxidation of weld metal. On the other hand, even though its total amount in the metal tube and flux is more than 0.2 mass % of the total mass of the wire, Ti does not produce additional effect. Therefore, the total amount of Ti in the metal tube and flux should preferably be less than 0.02–0.02 mass % of the total mass of the wire. Incidentally, Ti may be added to flux in the form of simple substance (such as Ti metal) or in the form of alloy (such as Fe—Ti).

The shielding gas that can be used in the present invention may be any of 100% $CO_2$, a mixed gas of Ar and $CO_2$, a mixed gas of Ar and $O_2$, and a mixed gas of Ar, $CO_2$, and $O_2$. The metal tube may be that of mild steel or alloy steel. The cross section of the metal tube is not specifically restricted; it may or may not have a seam. In the case of seamless cross section, the metal wire may be plated with Cu or Ni as one of the elements required in the present invention.

EXAMPLES

The invention will be described in more detail which reference to the following examples and comparative examples which demonstrate flux-cored wires for gas-shielded arc welding of heat resisting steel.

Example 1

Metal tubes having the compositions shown in Tables 1 and 2 were prepared. These metal tubes were made into flux-cored wires having the compositions shown in Tables 3 to 18. Incidentally, all the wires have a diameter of 1.2 mm.

In Tables 3 to 18, the symbol "<" denotes "less than", and the amount of metal fluorides is expressed in terms of total F amount. In Tables 9, 10, 13, 14, 17 and 18, the content of $TiO_2$, $SiO_2$, $Al_2O_3$, $ZrO_2$, and MgO constituting the slag-forming agent, and the content of NaF, $K_2SiF_6$, $CeF_2$, and total F are based on the total mass of the wire.

Test plates were prepared with each sample of the flux-cored wires, and the welding maneuverability of each sample was evaluated. The weld metal of the test plates was examined by radiographic examination and underwent tensile and impact tests after PWHT. FIG. 1 is a sectional view showing the test plate prepared in the example of the present invention.

The test plate was prepared in the following way. First, a pair of steel plates 1 having a butt groove angle of 45° are arranged. A backing strip 2 is arranged on the back side of the groove. Using one of the flux-cored wires shown in Tables 3 to 18, multi-layer build-up welding (6 layers and 12 passes) is carried out (starting from the front side of the groove) under the conditions shown in Table 19, so that the multi-layer weld metal 3 is formed in the groove. In this way the test plate is prepared. The test plate undergoes PWHT and then tested for the above-mentioned items. Welding of the steel plate 1 was carried out with wires Nos. 1 to 23 and 31 to 55 (conforming to ASTM A387 Gr. 22), wires Nos. 24 to 26 (conforming to ASTM A387, Gr. 11), wires Nos. 27 and 28 (conforming to ASTM A204 Gr. A), and wires Nos. 29 and 30 (conforming to ASTM A387 Gr. 2).

To evaluate the welding maneuverability, fillet welding (vertical position) was also performed, in addition to flat welding mentioned above, on the steel plate 1 using each sample of the wires shown in Tables 3 to 18 under the conditions shown in Table 20. Arc stability, slag removability, spatter amount, and bead shape were examined.

The weld metal was rated by radiographic examination as good if the test result meets the requirements of JIS Class 1; otherwise, it was rated as poor. On the other hand, the tensile and impact properties of the weld metal were evaluated according to the requirements specified in AWS A5.29-1998 and JIS Z3318-1991. The acceptable range of tensile and impact properties is shown in Table 21. The acceptable range of tensile and impact properties differ in the case of wires Nos. 1 to 23 and 31 to 55, wires Nos. 24 to 26, wires Nos. 27 and 28, and wires Nos. 29 and 30, because the kind of the steel to be welded is different.

Impact test was carried out at 0° C. using a specimen having a 2-mm deep V-notch. An average of three measurements was obtained. The chemical composition of weld metal was determined by chemical analysis of a sample taken from the center of weld metal (as shown in FIG. 1) using a drill (10 mm in diameter).

The results of the tests are shown in Tables 22 to 37. Incidentally, Tables 24, 28, 32, and 36 showing the results of radiant-ray test have the column of remarks in which "HC" denotes the occurrence of hot cracking, "BH" denotes the occurrence of blow hole, and "SI" denotes the occurrence of slag inclusion. In Tables 22, 23, 27, 30, 31, and 35, the symbol "<" means "less than".

TABLE 1

| Kind of steel | Steel tube | Composition of steel tube (mass %) | | | | | | |
|---|---|---|---|---|---|---|---|---|
| | | C | Si | Mn | P | S | Cu | Ni |
| Mild steel | A | 0.036 | 0.005 | 0.200 | 0.012 | 0.007 | 0.013 | 0.014 |
| | B | 0.020 | 0.030 | 0.300 | 0.010 | 0.010 | 0.005 | 0.005 |
| | C | 0.010 | 0.005 | 0.250 | 0.004 | 0.011 | 0.011 | 0.012 |
| Cr-Mo steel | D | 0.025 | 0.500 | 1.140 | 0.003 | 0.007 | 0.012 | 0.084 |
| | E | 0.031 | 0.480 | 1.100 | 0.007 | 0.005 | 0.013 | 0.031 |

TABLE 2

| Kind of steel | Steel tube | Composition of steel tube (mass %) | | | | | | |
|---|---|---|---|---|---|---|---|---|
| | | Cr | Mo | Ti | Nb | V | B | N |
| Mild steel | A | 0.020 | 0.005 | 0.001 | 0.003 | 0.001 | 0.0001 | 0.0024 |
| | B | 0.013 | 0.009 | 0.005 | 0.004 | 0.004 | 0.0001 | 0.0030 |
| | C | 0.019 | 0.002 | 0.001 | 0.003 | 0.001 | 0.0001 | 0.0033 |
| Cr-Mo steel | D | 1.390 | 0.480 | 0.002 | 0.003 | 0.003 | 0.0001 | 0.0030 |
| | E | 2.440 | 1.100 | 0.001 | 0.003 | 0.004 | 0.0001 | 0.0090 |

TABLE 3

| | Wire No. | Steel tube | Ratio of flux (mass %) | Slag-forming agent (mass %) | Composition of wire (mass %) | | | |
|---|---|---|---|---|---|---|---|---|
| | | | | | C | Si | Mn | P |
| Example No. | 1 | A | 13.50 | 7.02 | 0.032 | 0.405 | 0.851 | 0.016 |
| | 2 | A | 13.50 | 7.09 | 0.147 | 0.172 | 0.819 | 0.017 |
| | 3 | A | 11.50 | 6.44 | 0.068 | 0.077 | 0.680 | 0.014 |
| | 4 | A | 15.50 | 7.86 | 0.059 | 1.328 | 0.635 | 0.015 |
| | 5 | A | 15.50 | 6.44 | 0.068 | 0.165 | 0.566 | 0.014 |
| | 6 | A | 13.50 | 7.02 | 0.055 | 0.117 | 1.539 | 0.014 |
| | 7 | B | 11.00 | 6.61 | 0.034 | 0.135 | 0.653 | 0.012 |
| | 8 | B | 11.50 | 6.91 | 0.034 | 0.140 | 0.669 | 0.012 |
| | 9 | A | 15.00 | 7.80 | 0.074 | 0.490 | 0.985 | 0.014 |
| | 10 | A | 15.00 | 7.61 | 0.066 | 1.068 | 1.069 | 0.015 |
| | 11 | A | 15.00 | 7.61 | 0.066 | 0.551 | 1.056 | 0.014 |
| | 12 | A | 12.00 | 6.72 | 0.061 | 0.277 | 0.683 | 0.014 |
| | 13 | A | 16.00 | 9.50 | 0.116 | 0.485 | 1.058 | 0.015 |
| | 14 | A | 13.00 | 7.25 | 0.053 | 0.273 | 0.914 | 0.014 |
| | 15 | A | 13.00 | 7.25 | 0.063 | 0.273 | 0.914 | 0.014 |

TABLE 4

| | Wire No. | Composition of wire (mass %) | | | | | | | |
|---|---|---|---|---|---|---|---|---|---|
| | | S | Cu | Ni | Cr | Mo | Ti | Nb | V |
| Example No. | 1 | 0.016 | 0.011 | 0.012 | 2.116 | 0.925 | <0.005 | <0.005 | <0.005 |
| | 2 | 0.016 | 0.011 | 0.012 | 2.277 | 0.934 | <0.005 | <0.005 | <0.005 |
| | 3 | 0.013 | 0.012 | 0.012 | 2.061 | 0.904 | <0.005 | 0.017 | 0.020 |
| | 4 | 0.013 | 0.011 | 0.012 | 2.185 | 1.013 | <0.005 | 0.020 | 0.024 |
| | 5 | 0.013 | 0.012 | 0.012 | 2.084 | 0.904 | <0.005 | 0.017 | 0.020 |
| | 6 | 0.013 | 0.011 | 0.012 | 2.115 | 0.976 | <0.005 | 0.018 | 0.021 |
| | 7 | 0.015 | 0.008 | 0.013 | 1.977 | 0.834 | <0.005 | 0.017 | 0.022 |
| | 8 | 0.015 | 0.014 | 0.008 | 2.066 | 0.872 | <0.005 | 0.018 | 0.022 |
| | 9 | 0.013 | 0.011 | 0.012 | 2.417 | 0.981 | <0.005 | 0.020 | 0.024 |
| | 10 | 0.013 | 0.011 | 0.012 | 2.201 | 0.981 | <0.005 | 0.019 | 0.023 |
| | 11 | 0.013 | 0.011 | 0.012 | 2.215 | 0.981 | <0.005 | 0.019 | 0.023 |
| | 12 | 0.013 | 0.011 | 0.012 | 2.174 | 0.943 | <0.005 | 0.014 | 0.016 |
| | 13 | 0.013 | 0.011 | 0.012 | 2.091 | 1.006 | <0.005 | 0.024 | 0.029 |
| | 14 | 0.013 | 0.011 | 0.012 | 2.132 | 0.997 | <0.005 | 0.019 | 0.023 |
| | 15 | 0.013 | 0.011 | 0.012 | 2.158 | 0.981 | <0.005 | 0.019 | 0.022 |

TABLE 5

| | Wire No. | Composition of wire (mass %) | | | Slag-forming gent (mass %) | | | |
|---|---|---|---|---|---|---|---|---|
| | | B | N | Mg | $TiO_2$ | $SiO_2$ | $Al_2O_3$ | $ZrO_2$ |
| Example No. | 1 | <0.002 | 0.002 | 1.079 | 6.244 | 0.357 | 0.042 | 0.000 |
| | 2 | <0.002 | 0.002 | 0.944 | 6.244 | 0.388 | 0.024 | 0.000 |
| | 3 | 0.007 | 0.002 | 0.804 | 5.559 | 0.335 | 0.056 | 0.000 |
| | 4 | 0.014 | 0.002 | 0.310 | 6.717 | 0.442 | 0.010 | 0.000 |
| | 5 | 0.007 | 0.002 | 0.689 | 5.559 | 0.335 | 0.056 | 0.000 |

TABLE 5-continued

| Wire No. | Composition of wire (mass %) | | | Slag-forming agent (mass %) | | | |
|---|---|---|---|---|---|---|---|
| | B | N | Mg | TiO$_2$ | SiO$_2$ | Al$_2$O$_3$ | ZrO$_2$ |
| 6 | 0.012 | 0.002 | 0.944 | 6.019 | 0.387 | 0.009 | 0.000 |
| 7 | 0.007 | 0.003 | 0.330 | 5.238 | 0.439 | 0.084 | 0.000 |
| 8 | 0.008 | 0.003 | 0.345 | 5.476 | 0.459 | 0.086 | 0.000 |
| 9 | 0.013 | 0.002 | 1.049 | 6.688 | 0.430 | 0.010 | 0.000 |
| 10 | 0.013 | 0.002 | 0.225 | 6.500 | 0.428 | 0.010 | 0.000 |
| 11 | 0.013 | 0.002 | 1.424 | 6.500 | 0.428 | 0.010 | 0.000 |
| 12 | 0.008 | 0.002 | 0.480 | 4.391 | 1.503 | 0.073 | 0.000 |
| 13 | 0.010 | 0.002 | 0.639 | 8.120 | 0.389 | 0.008 | 0.000 |
| 14 | 0.008 | 0.002 | 0.649 | 6.410 | 0.380 | 0.063 | 0.000 |
| 15 | 0.008 | 0.002 | 0.649 | 6.260 | 0.176 | 0.005 | 0.000 |

TABLE 6

| | Wire No. | Composition of slag-forming agent (mass %) | | | | | |
|---|---|---|---|---|---|---|---|
| | | MgO | Others | NaF | K$_2$SiF$_6$ | CeF$_3$ | CaF$_2$ | Total F |
| Example No. | 1 | 0.000 | 0.095 | 0.146 | 0.094 | 0.000 | 0.039 | 0.134 |
| | 2 | 0.066 | 0.081 | 0.146 | 0.134 | 0.000 | 0.000 | 0.135 |
| | 3 | 0.000 | 0.241 | 0.237 | 0.000 | 0.000 | 0.000 | 0.107 |
| | 4 | 0.000 | 0.355 | 0.168 | 0.154 | 0.000 | 0.000 | 0.156 |
| | 5 | o.000 | 0.241 | 0.247 | 0.000 | 0.000 | 0.000 | 0.107 |
| | 6 | 0.000 | 0.313 | 0.146 | 0.134 | 0.000 | 0.000 | 0.135 |
| | 7 | 0.000 | 0.310 | 0.216 | 0.038 | 0.274 | 0.000 | 0.194 |
| | 8 | 0.000 | 0.324 | 0.226 | 0.034 | 0.286 | 0.000 | 0.203 |
| | 9 | 0.000 | 0.348 | 0.162 | 0.149 | 0.000 | 0.000 | 0.151 |
| | 10 | 0.000 | 0.345 | 0.310 | 0.000 | 0.000 | 0.000 | 0.140 |
| | 11 | 0.000 | 0.345 | 0.310 | 0.000 | 0.000 | 0.000 | 0.140 |
| | 12 | 0.000 | 0.265 | 0.248 | 0.000 | 0.219 | 0.000 | 0.175 |
| | 13 | 0.000 | 0.385 | 0.094 | 0.000 | 0491 | 0.000 | 0.185 |
| | 14 | 0.000 | 0.291 | 0.000 | 0.000 | 0.097 | 0.000 | 0.028 |
| | 15 | 0.000 | 0.253 | 0.441 | 0.000 | 0.108 | 0.000 | 0.231 |

TABLE 7

| | Wire No. | Steel tube | Ratio of flux (mass %) | Slag-forming agent (mass %) | Composition of wire (mass %) | | | |
|---|---|---|---|---|---|---|---|---|
| | | | | | C | Si | Mn | P |
| Example No. | 16 | A | 15.00 | 7.61 | 0.066 | 1.067 | 1.069 | 0.015 |
| | 17 | A | 15.50 | 7.86 | 0.067 | 1.103 | 0.789 | 0.015 |
| | 18 | A | 12.00 | 6.24 | 0.061 | 0.482 | 0.685 | 0.014 |
| | 19 | A | 16.00 | 9.74 | 0.115 | 0.506 | 0.974 | 0.015 |
| | 20 | C | 13.50 | 7.02 | 0.033 | 0.346 | 1.147 | 0.009 |
| | 21 | C | 15.00 | 7.61 | 0.044 | 0.846 | 0.877 | 0.009 |
| | 22 | D | 13.50 | 7.02 | 0.032 | 0.767 | 1.096 | 0.006 |
| | 23 | E | 13.50 | 7.02 | 0.036 | 0.741 | 1.065 | 0.010 |
| | 24 | A | 15.00 | 7.80 | 0.057 | 0.565 | 1.209 | 0.014 |
| | 25 | C | 15.00 | 7.80 | 0.035 | 0.566 | 1.251 | 0.009 |
| | 26 | D | 13.50 | 7.02 | 0.031 | 0.758 | 1.100 | 0.006 |
| | 27 | A | 15.00 | 7.76 | 0.046 | 0.563 | 1.204 | 0.014 |
| | 28 | C | 15.00 | 7.76 | 0.024 | 0.563 | 1.247 | 0.009 |
| | 29 | A | 15.00 | 7.76 | 0.047 | 0.576 | 0.650 | 0.014 |
| | 30 | C | 15.00 | 7.76 | 0.024 | 0.576 | 0.693 | 0.009 |

TABLE 8

| | Wire No. | Composition of wire (mass %) | | | | | | | |
|---|---|---|---|---|---|---|---|---|---|
| | | S | Cu | Ni | Cr | Mo | Ti | Nb | V |
| Example No. | 16 | 0.013 | 0.011 | 0.012 | 2.201 | 0.943 | 0.034 | 0.019 | 0.022 |
| | 17 | 0.013 | 0.011 | 0.012 | 2.212 | 0.965 | 0.197 | 0.019 | 0.023 |
| | 18 | 0.013 | 0.011 | 0.012 | 2.174 | 0.943 | <0.005 | 0.014 | 0.016 |
| | 19 | 0.013 | 0.011 | 0.012 | 2.091 | 1.006 | <0.005 | 0.023 | 0.028 |
| | 20 | 0.010 | 0.010 | 0.010 | 2.115 | 0.881 | <0.005 | 0.018 | 0.021 |

TABLE 8-continued

| Wire No. | Composition of wire (mass %) | | | | | | |
|---|---|---|---|---|---|---|---|
| | S | Cu | Ni | Cr | Mo | Ti | Nb | V |
| 21 | 0.010 | 0.009 | 0.010 | 2.250 | 1.025 | <0.005 | 0.017 | 0.020 |
| 22 | 0.012 | 0.011 | 0.073 | 2.042 | 1.007 | <0.005 | 0.018 | 0.023 |
| 23 | 0.010 | 0.012 | 0.027 | 2.111 | 1.036 | <0.005 | 0.018 | 0.024 |
| 24 | 0.012 | 0.011 | 0.012 | 1.297 | 0.464 | <0.005 | 0.020 | 0.024 |
| 25 | 0.010 | 0.010 | 0.010 | 1.296 | 0.462 | <0.005 | 0.020 | 0.024 |
| 26 | 0.012 | 0.011 | 0.073 | 1.203 | 0.500 | <0.005 | 0.018 | 0.023 |
| 27 | 0.012 | 0.011 | 0.012 | 0.018 | 0.464 | <0.005 | 0.020 | 0.024 |
| 28 | 0.010 | 0.010 | 0.010 | 0.017 | 0.462 | <0.005 | 0.020 | 0.024 |
| 29 | 0.012 | 0.011 | 0.012 | 0.542 | 0.464 | <0.005 | 0.020 | 0.024 |
| 30 | 0.010 | 0.010 | 0.010 | 0.541 | 0.462 | <0.005 | 0.020 | 0.024 |

TABLE 9

| | Wire No. | Composition of wire (mass %) | | | Composition of Slag-forming agent (mass %) | | | |
|---|---|---|---|---|---|---|---|---|
| | | B | N | Mg | $TiO_2$ | $SiO_2$ | $Al_2O_3$ | $ZrO_2$ |
| Example No. | 16 | 0.013 | 0.002 | 0.210 | 6.211 | 0.473 | 0.159 | 0.101 |
| | 17 | 0.014 | 0.002 | 0.217 | 6.418 | 0.489 | 0.164 | 0.104 |
| | 18 | 0.008 | 0.002 | 0.480 | 4.391 | 1.035 | 0.067 | 0.000 |
| | 19 | 0.010 | 0.002 | 0.400 | 7.935 | 0.809 | 0.013 | 0.000 |
| | 20 | 0.012 | 0.003 | 0.944 | 6.019 | 0.387 | 0.009 | 0.000 |
| | 21 | 0.013 | 0.003 | 0.599 | 6.743 | 0.356 | 0.012 | 0.000 |
| | 22 | 0.012 | 0.007 | 0.944 | 6.019 | 0.387 | 0.009 | 0.000 |
| | 23 | 0.012 | 0.008 | 0.944 | 6.019 | 0.387 | 0.009 | 0.000 |
| | 24 | 0.013 | 0.002 | 1.049 | 6.688 | 0.430 | 0.010 | 0.000 |
| | 25 | 0.013 | 0.003 | 1.049 | 6.688 | 0.430 | 0.010 | 0.000 |
| | 26 | 0.012 | 0.007 | 0.944 | 6.019 | 0.387 | 0.009 | 0.000 |
| | 27 | <0.002 | 0.002 | 1.049 | 6.688 | 0.449 | 0.004 | 0.000 |
| | 28 | <0.002 | 0.003 | 1.049 | 6.688 | 0.449 | 0.004 | 0.000 |
| | 29 | <0.002 | 0.002 | 1.049 | 6.688 | 0.449 | 0.004 | 0.000 |
| | 30 | <0.002 | 0.003 | 1.049 | 6.688 | 0.449 | 0.004 | 0.000 |

TABLE 10

| | Wire No. | Composition of slag-forming agent (mass %) | | | | | |
|---|---|---|---|---|---|---|---|
| | | MgO | Others | NaF | $K_2SiF_6$ | $CeF_3$ | $CaF_2$ | Total F |
| Example No. | 16 | 0.000 | 0.339 | 0.310 | 0.000 | 0.000 | 0.000 | 0.140 |
| | 17 | 0.000 | 0.351 | 0.320 | 0.000 | 0.000 | 0.000 | 0.145 |
| | 18 | 0.000 | 0.264 | 0.248 | 0.000 | 0.219 | 0.000 | 0.175 |
| | 19 | 0.000 | 0.381 | 0.094 | 0.000 | 0.491 | 0.000 | 0.185 |
| | 20 | 0.000 | 0.313 | 0.146 | 0.134 | 0.000 | 0.000 | 0.135 |
| | 21 | 0.000 | 0.183 | 0.310 | 0.000 | 0.000 | 0.000 | 0.140 |
| | 22 | 0.000 | 0.313 | 0.146 | 0.134 | 0.000 | 0.000 | 0.135 |
| | 23 | 0.000 | 0.313 | 0.146 | 0.134 | 0.000 | 0.000 | 0.135 |
| | 24 | 0.000 | 0.348 | 0.162 | 0.149 | 0.000 | 0.000 | 0.151 |
| | 25 | 0.000 | 0.348 | 0.162 | 0.149 | 0.000 | 0.000 | 0.151 |
| | 26 | 0.000 | 0.313 | 0.146 | 0.134 | 0.000 | 0.000 | 0.135 |
| | 27 | 0.000 | 0.289 | 0.162 | 0.149 | 0.000 | 0.000 | 0.151 |
| | 28 | 0.000 | 0.289 | 0.162 | 0.149 | 0.000 | 0.000 | 0.151 |
| | 29 | 0.000 | 0.289 | 0.162 | 0.149 | 0.000 | 0.000 | 0.151 |
| | 30 | 0.000 | 0.289 | 0.162 | 0.149 | 0.000 | 0.000 | 0.151 |

TABLE 11

| | Wire No. | Steel tube | Ratio of flux (mass %) | Slag-forming agent (mass %) | Composition of wire (mass %) | | | |
|---|---|---|---|---|---|---|---|---|
| | | | | | C | Si | Mn | P |
| Comparative | 31 | A | 16.40 | 8.20 | 0.211 | 1.061 | 1.088 | 0.017 |
| tive | 32 | A | 11.50 | 6.33 | 0.039 | 0.011 | 0.935 | 0.016 |

TABLE 11-continued

|  | Wire No. | Steel tube | Ratio of flux (mass %) | Slag-forming agent (mass %) | Composition of wire (mass %) | | | |
|---|---|---|---|---|---|---|---|---|
|  |  |  |  |  | C | Si | Mn | P |
| Example No. | 33 | A | 16.00 | 8.64 | 0.033 | 1.468 | 0.688 | 0.017 |
|  | 34 | A | 15.00 | 8.25 | 0.053 | 1.028 | 0.524 | 0.017 |
|  | 35 | A | 15.00 | 8.25 | 0.052 | 0.529 | 1.673 | 0.016 |
|  | 36 | B | 12.00 | 6.78 | 0.036 | 0.256 | 0.946 | 0.015 |
|  | 37 | A | 11.00 | 6.22 | 0.048 | 0.090 | 0.564 | 0.016 |
|  | 38 | B | 11.00 | 6.61 | 0.034 | 0.670 | 0.670 | 0.015 |
|  | 39 | A | 11.00 | 6.61 | 0.048 | 0.117 | 0.564 | 0.016 |
|  | 40 | A | 16.50 | 8.91 | 0.076 | 0.376 | 1.159 | 0.017 |
|  | 41 | A | 15.50 | 9.15 | 0.064 | 0.965 | 1.262 | 0.017 |
|  | 42 | A | 15.50 | 9.15 | 0.032 | 0.534 | 0.856 | 0.016 |
|  | 43 | A | 15.50 | 9.46 | 0.032 | 0.535 | 0.855 | 0.017 |
|  | 44 | A | 15.50 | 9.61 | 0.032 | 0.535 | 0.855 | 0.016 |
|  | 45 | A | 16.00 | 8.80 | 0.034 | 1.010 | 1.342 | 0.016 |

TABLE 12

|  | Wire No. | Composition of wire (mass %) | | | | | | | |
|---|---|---|---|---|---|---|---|---|---|
|  |  | S | Cu | Ni | Cr | Mo | Ti | Nb | V |
| Comparative Example No. | 31 | 0.016 | 0.011 | 0.012 | 2.045 | 0.928 | <0.005 | <0.005 | <0.005 |
|  | 32 | 0.016 | 0.012 | 0.012 | 2.221 | 0.896 | <0.005 | <0.005 | <0.005 |
|  | 33 | 0.015 | 0.011 | 0.012 | 1.946 | 0.906 | <0.005 | <0.005 | <0.005 |
|  | 34 | 0.015 | 0.011 | 0.012 | 2.017 | 0.849 | <0.005 | <0.005 | <0.005 |
|  | 35 | 0.016 | 0.011 | 0.012 | 2.114 | 0.849 | <0.005 | <0.005 | <0.005 |
|  | 36 | 0.018 | 0.004 | 0.040 | 2.024 | 0.947 | <0.005 | <0.005 | <0.005 |
|  | 37 | 0.016 | 0.110 | 0.012 | 2.115 | 1.037 | <0.005 | <0.005 | <0.005 |
|  | 38 | 0.018 | 0.010 | 0.004 | 2.005 | 0.834 | <0.005 | <0.005 | <0.005 |
|  | 39 | 0.016 | 0.012 | 0.100 | 1.999 | 0.831 | <0.005 | <0.005 | <0.005 |
|  | 40 | 0.015 | 0.011 | 0.012 | 2.655 | 0.830 | <0.005 | 0.003 | 0.005 |
|  | 41 | 0.015 | 0.011 | 0.012 | 2.369 | 0.276 | <0.005 | 0.003 | 0.004 |
|  | 42 | 0.016 | 0.011 | 0.012 | 2.075 | 1.324 | <0.005 | 0.003 | 0.004 |
|  | 43 | 0.016 | 0.011 | 0.012 | 1.998 | 0.975 | <0.005 | 0.003 | 0.003 |
|  | 44 | 0.016 | 0.011 | 0.012 | 1.998 | 0.975 | <0.005 | 0.003 | 0.005 |
|  | 45 | 0.015 | 0.011 | 0.012 | 2.291 | 0.906 | <0.005 | 0.003 | 0.005 |

TABLE 13

|  | Wire No. | Composition of wire (mass %) | | | Slag Forming agent (mass %) | | | |
|---|---|---|---|---|---|---|---|---|
|  |  | B | N | Mg | TiO$_2$ | SiO$_2$ | Al$_2$O$_3$ | ZrO$_2$ |
| Comparative Example No. | 31 | <0.002 | 0.002 | 1.040 | 6.914 | 0.420 | 0.110 | 0.000 |
|  | 32 | <0.002 | 0.002 | 1.034 | 5.514 | 0.319 | 0.074 | 0.000 |
|  | 33 | <0.002 | 0.002 | 2.240 | 7.704 | 0.289 | 0.077 | 0.000 |
|  | 34 | <0.002 | 0.002 | 0.375 | 7.233 | 0.360 | 0.072 | 0.000 |
|  | 35 | <0.002 | 0.002 | 0.524 | 7.178 | 0.445 | 0.075 | 0.000 |
|  | 36 | <0.002 | 0.003 | 0.360 | 5.922 | 0.292 | 0.062 | 0.000 |
|  | 37 | <0.002 | 0.002 | 0.330 | 5.429 | 0.327 | 0.054 | 0.000 |
|  | 38 | <0.002 | 0.003 | 0.330 | 5.434 | 0.380 | 0.086 | 0.000 |
|  | 39 | <0.002 | 0.002 | 0.330 | 5.434 | 0.440 | 0.083 | 0.000 |
|  | 40 | <0.000 | 0.002 | 1.319 | 7.615 | 0.292 | 0.077 | 0.000 |
|  | 41 | 0.000 | 0.002 | 0.418 | 7.154 | 0.710 | 0.074 | 0.520 |
|  | 42 | 0.000 | 0.002 | 0.310 | 7.154 | 0.620 | 0.072 | 0.520 |
|  | 43 | 0.000 | 0.002 | 0.619 | 4.119 | 3.879 | 0.119 | 0.822 |
|  | 44 | 0.000 | 0.002 | 0.465 | 8.315 | 0.565 | 0.011 | 0.302 |
|  | 45 | 0.000 | 0.002 | 0.192 | 7.385 | 0.470 | 0.228 | 0.000 |

TABLE 14

|  | Wire No. | Composition of slag-forming agent (mass %) | | | | | | |
|---|---|---|---|---|---|---|---|---|
|  |  | MgO | Others | NaF | K$_2$SiF$_6$ | CeF$_3$ | CaF$_2$ | Total F |
| Comparative | 31 | 0.321 | 0.118 | 0.177 | 0.000 | 0.136 | 0.000 | 0.120 |
|  | 32 | 0.067 | 0.095 | 0.181 | 0.000 | 0.048 | 0.022 | 0.107 |

TABLE 14-continued

|  | Wire No. | Composition of slag-forming agent (mass %) | | | | | |
|---|---|---|---|---|---|---|---|
|  |  | MgO | Others | NaF | K₂SiF₆ | CeF₃ | CaF₂ | Total F |
| Example No. | 33 | 0.172 | 0.090 | 0.173 | 0.000 | 0.133 | 0.000 | 0.117 |
|  | 34 | 0.000 | 0.135 | 0.310 | 0.149 | 0.000 | 0.000 | 0.217 |
|  | 35 | 0.000 | 0.063 | 0.442 | 0.045 | 0.000 | 0.000 | 0.223 |
|  | 36 | 0.000 | 0.113 | 0.354 | 0.036 | 0.000 | 0.000 | 0.179 |
|  | 37 | 0.000 | 0.045 | 0.324 | 0.033 | 0.000 | 0.000 | 0.164 |
|  | 38 | 0.000 | 0.147 | 0.433 | 0.033 | 0.091 | 0.000 | 0.239 |
|  | 39 | 0.000 | 0.088 | 0.433 | 0.033 | 0.091 | 0.000 | 0.239 |
|  | 40 | 0.186 | 0.123 | 0.341 | 0.000 | 0.274 | 0.000 | 0.233 |
|  | 41 | 0.000 | 0.196 | 0.000 | 0.231 | 0.257 | 0.000 | 0.194 |
|  | 42 | 0.000 | 0.200 | 0.320 | 0.000 | 0.257 | 0.000 | 0.219 |
|  | 43 | 0.000 | 0.163 | 0.320 | 0.000 | 0.000 | 0.000 | 0.145 |
|  | 44 | 0.000 | 0.093 | 0.320 | 0.000 | 0.000 | 0.000 | 0.145 |
|  | 45 | 0.000 | 0.131 | 0.157 | 0.080 | 0.345 | 0.000 | 0.212 |

TABLE 15

|  | Wire No. | Steel tube | Ratio of flux (mass %) | Slag-forming agent (mass %) | Composition of wire (mass %) | | | |
|---|---|---|---|---|---|---|---|---|
|  |  |  |  |  | C | Si | Mn | P |
| Comparative Example No. | 46 | A | 15.50 | 8.37 | 0.074 | 0.490 | 0.830 | 0.017 |
|  | 47 | A | 15.50 | 8.37 | 0.064 | 0.709 | 0.687 | 0.017 |
|  | 48 | A | 15.50 | 8.37 | 0.064 | 0.709 | 0.687 | 0.017 |
|  | 49 | A | 11.50 | 5.96 | 0.072 | 0.168 | 0.609 | 0.017 |
|  | 50 | A | 17.00 | 10.10 | 0.066 | 0.631 | 0.742 | 0.016 |
|  | 51 | A | 11.50 | 6.56 | 0.039 | 0.036 | 0.499 | 0.016 |
|  | 52 | A | 15.50 | 9.75 | 0.031 | 0.284 | 0.854 | 0.017 |
|  | 53 | A | 11.50 | 5.96 | 0.062 | 0.042 | 0.506 | 0.017 |
|  | 54 | A | 17.00 | 10.10 | 0.066 | 0.631 | 0.742 | 0.017 |
|  | 55 | A | 16.00 | 8.64 | 0.032 | 1.480 | 0.438 | 0.017 |

TABLE 16

|  | Wire No. | Composition of wire (mass %) | | | | | | | |
|---|---|---|---|---|---|---|---|---|---|
|  |  | S | Cu | Ni | Cr | Mo | Ti | Nb | V |
| Comparative Example No. | 46 | 0.015 | 0.011 | 0.012 | 2.082 | 0.877 | <0.005 | 0.003 | 0.004 |
|  | 47 | 0.015 | 0.011 | 0.012 | 2.082 | 0.877 | <0.005 | 0.003 | 0.004 |
|  | 48 | 0.015 | 0.011 | 0.012 | 2.082 | 0.877 | <0.005 | 0.003 | 0.005 |
|  | 49 | 0.015 | 0.012 | 0.012 | 2.148 | 0.919 | <0.005 | 0.003 | 0.004 |
|  | 50 | 0.015 | 0.011 | 0.012 | 2.053 | 0.962 | <0.005 | 0.003 | 0.005 |
|  | 51 | 0.015 | 0.012 | 0.012 | 2.221 | 0.896 | <0.005 | 0.003 | 0.004 |
|  | 52 | 0.016 | 0.011 | 0.012 | 1.997 | 0.975 | <0.005 | 0.003 | 0.003 |
|  | 53 | 0.016 | 0.012 | 0.012 | 2.084 | 0.868 | <0.005 | 0.003 | 0.004 |
|  | 54 | 0.015 | 0.011 | 0.012 | 2.053 | 0.962 | <0.005 | 0.003 | 0.003 |
|  | 55 | 0.015 | 0.011 | 0.012 | 2.015 | 0.906 | <0.005 | 0.003 | 0.005 |

TABLE 17

|  | Wire No. | Composition of wire (mass %) | | | Slag-forming agent (mass %) | | | |
|---|---|---|---|---|---|---|---|---|
|  |  | B | N | Mg | TiO₂ | SiO₂ | Al₂O₃ | ZrO₂ |
| Comparative Example No. | 46 | 0.000 | 0.002 | 1.548 | 7.154 | 0.274 | 0.250 | 0.000 |
|  | 47 | 0.000 | 0.002 | 1.239 | 7.154 | 0.751 | 0.163 | 0.000 |
|  | 48 | 0.000 | 0.002 | 1.239 | 7.316 | 0.168 | 0.060 | 0.000 |
|  | 49 | 0.000 | 0.002 | 0.919 | 5.285 | 0.332 | 0.055 | 0.000 |
|  | 50 | 0.000 | 0.002 | 1.274 | 8.152 | 1.219 | 0.187 | 0.000 |
|  | 51 | 0.000 | 0.002 | 1.034 | 5.514 | 0.544 | 0.077 | 0.000 |
|  | 52 | 0.000 | 0.002 | 0.619 | 4.119 | 3.879 | 0.119 | 0.882 |
|  | 53 | 0.000 | 0.002 | 0.919 | 5.285 | 0.332 | 0.055 | 0.000 |
|  | 54 | 0.000 | 0.002 | 1.274 | 4.076 | 4.675 | 0.530 | 0.000 |
|  | 55 | 0.000 | 0.002 | 0.240 | 7.704 | 0.289 | 0.077 | 0.000 |

TABLE 18

| | Wire No. | Composition of slag-forming agent (mass %) | | | | | |
|---|---|---|---|---|---|---|---|
| | | MgO | Others | NaF | K₂SiF₆ | CeF₃ | CaF₂ | Total F |
| Comparative Example No. | 46 | 0.000 | 0.113 | 0.320 | 0.000 | 0.257 | 0.000 | 0.219 |
| | 47 | 0.000 | 0.213 | 0.000 | 0.000 | 0.077 | 0.000 | 0.022 |
| | 48 | 0.000 | 0.120 | 0.213 | 0.092 | 0.399 | 0.000 | 0.260 |
| | 49 | 0.000 | 0.043 | 0.124 | 0.114 | 0.000 | 0.000 | 0.115 |
| | 50 | 0.000 | 0.136 | 0.217 | 0.169 | 0.000 | 0.000 | 0.186 |
| | 51 | 0.067 | 0.096 | 0.181 | 0.000 | 0.048 | 0.022 | 0.107 |
| | 52 | 0.000 | 0.168 | 0.609 | 0.000 | 0.000 | 0.000 | 0.276 |
| | 53 | 0.000 | 0.043 | 0.124 | 0.114 | 0.000 | 0.000 | 0.115 |
| | 54 | 0.000 | 0.363 | 0.217 | 0.169 | 0.000 | 0.000 | 0.186 |
| | 55 | 0.172 | 0.090 | 0.173 | 0.000 | 0.133 | 0.000 | 0.177 |

TABLE 19

| Welding conditions | | Corresponding wire |
|---|---|---|
| Welding current | 250 A (DCEP) | |
| Arc voltage | 30–32 V | |
| Welding speed | 25–30 cm/min | |
| Welding position | Flat position | |
| Shielding gas flow rate | 25 liters/min | |
| Preheating and interpass temperature | 176 ± 15° C. | Wire Nos. 1 to 26 and 29 to 55 |
| | 150 ± 15° C. | Wire Nos. 27 and 28 |

TABLE 20

| Welding conditions | | Corresponding wire |
|---|---|---|
| Welding current | 250 A (DCEP) | |
| Arc voltage | 24–26 V | |
| Welding speed | 20–30 cm/min | |
| Welding position | Vertical position | |
| Shielding gas flow rate | 25 liters/min | |
| Preheating and interpass temperature | 176 ± 15° C. | Wire Nos. 1 to 26 and 29 to 55 |
| | 150 ± 15° C. | Wire Nos. 27 and 28 |

TABLE 21

| Wire | Acceptable tensile properties | | | Acceptable impact properties |
|---|---|---|---|---|
| | 0.2% proof stress | Tensile strength | Elongation | |
| Wire Nos. 1 to 23 Wire Nos. 31 to 55 | 540 MPa and above | 630–760 MPa | 17% and above | 27 J and above for average values and measured values |
| Wire Nos. 24 to 30 | 470 MPa and above | 560–690 MPa | 19% and above | |

TABLE 22

|  | Wire |  | Composition of weld metal (mass %) | | | | | |
|---|---|---|---|---|---|---|---|---|
|  | No. | No. | Shielding gas | C | Si | Mn | P | S | Cu |
| Example | 1 | 1 | 100% $CO_2$ | 0.036 | 0.22 | 0.48 | 0.017 | 0.015 | 0.019 |
| No. | 2 | 2 | 100% $CO_2$ | 0.150 | 0.09 | 0.46 | 0.017 | 0.016 | 0.019 |
|  | 3 | 3 | 80% Ar + 20% $CO_2$ | 0.079 | 0.23 | 0.66 | 0.015 | 0.013 | 0.019 |
|  | 4 | 4 | 100% $CO_2$ | 0.065 | 0.71 | 0.36 | 0.015 | 0.013 | 0.018 |
|  | 5 | 5 | 75% Ar + 25% $CO_2$ | 0.079 | 0.28 | 0.60 | 0.015 | 0.013 | 0.019 |
|  | 6 | 6 | 75% Ar + 25% $CO_2$ | 0.066 | 0.25 | 1.14 | 0.015 | 0.013 | 0.019 |
|  | 7 | 7 | 80% Ar + 20% $CO_2$ | 0.042 | 0.26 | 0.64 | 0.013 | 0.015 | 0.013 |
|  | 8 | 8 | 80% Ar + 20% $CO_2$ | 0.043 | 0.26 | 0.65 | 0.013 | 0.015 | 0.023 |
|  | 9 | 9 | 100% $CO_2$ | 0.083 | 0.26 | 0.56 | 0.015 | 0.013 | 0.018 |
|  | 10 | 10 | 100% $CO_2$ | 0.073 | 0.57 | 0.60 | 0.015 | 0.013 | 0.018 |
|  | 11 | 11 | 100% $CO_2$ | 0.079 | 0.29 | 0.60 | 0.015 | 0.013 | 0.018 |
|  | 12 | 12 | 100% $CO_2$ | 0.067 | 0.15 | 0.38 | 0.015 | 0.013 | 0.019 |
|  | 13 | 13 | 100% $CO_2$ | 0.130 | 0.26 | 0.61 | 0.015 | 0.013 | 0.019 |
|  | 14 | 14 | 100% $CO_2$ | 0.070 | 0.15 | 0.51 | 0.015 | 0.013 | 0.019 |
|  | 15 | 15 | 100% $CO_2$ | 0.070 | 0.15 | 0.51 | 0.015 | 0.013 | 0.019 |

TABLE 23

|  |  | Composition of weld metal (mass %) | | | | | | | |
|---|---|---|---|---|---|---|---|---|---|
|  |  | Ni | Cr | Mo | Ti | Nb | V | B | N |
| Example | 1 | 0.018 | 2.15 | 1.04 | 0.022 | <0.005 | <0.005 | <0.002 | 0.004 |
| No. | 2 | 0.018 | 2.31 | 1.05 | 0.022 | <0.005 | <0.005 | <0.002 | 0.004 |
|  | 3 | 0.018 | 2.27 | 1.01 | 0.045 | 0.009 | 0.022 | 0.002 | 0.004 |
|  | 4 | 0.018 | 2.24 | 1.14 | 0.023 | 0.007 | 0.021 | 0.005 | 0.004 |
|  | 5 | 0.018 | 2.29 | 1.01 | 0.043 | 0.009 | 0.022 | 0.002 | 0.004 |
|  | 6 | 0.018 | 2.34 | 1.09 | 0.044 | 0.009 | 0.024 | 0.004 | 0.004 |
|  | 7 | 0.020 | 2.19 | 0.93 | 0.046 | 0.009 | 0.024 | 0.002 | 0.005 |
|  | 8 | 0.012 | 2.28 | 0.97 | 0.047 | 0.009 | 0.024 | 0.003 | 0.005 |
|  | 9 | 0.018 | 2.47 | 1.11 | 0.023 | 0.007 | 0.021 | 0.004 | 0.004 |
|  | 10 | 0.018 | 2.25 | 1.10 | 0.023 | 0.007 | 0.020 | 0.004 | 0.004 |
|  | 11 | 0.018 | 2.26 | 1.10 | 0.022 | 0.007 | 0.020 | 0.004 | 0.004 |
|  | 12 | 0.018 | 2.20 | 1.05 | 0.018 | 0.005 | 0.014 | 0.003 | 0.004 |
|  | 13 | 0.018 | 2.18 | 1.16 | 0.025 | 0.008 | 0.026 | 0.003 | 0.004 |
|  | 14 | 0.018 | 2.17 | 1.12 | 0.022 | 0.007 | 0.020 | 0.003 | 0.004 |
|  | 15 | 0.018 | 2.19 | 1.10 | 0.022 | 0.006 | 0.020 | 0.003 | 0.004 |

TABLE 24

| No. | Rating of welding maneuverability | Radiographic examination | | Conditions of PWHT (° C. × hr, cooled in furnace) |
|---|---|---|---|---|
|  |  | Rating | Note |  |
| Example No. |  |  |  |  |
| 1 | Good | Good | JIS Class 1 | — | 690 × 1 |
| 2 | Good | Good | JIS Class 1 | — | 690 × 1 |
| 3 | Good | Good | JIS Class 1 | — | 690 × 1 |
| 4 | Good | Good | JIS Class 1 | — | 690 × 1 |
| 5 | Good | Good | JIS Class 1 | — | 690 × 1 |
| 6 | Good | Good | JIS Class 1 | — | 690 × 1 |
| 7 | Good | Good | JIS Class 1 | — | 690 × 1 |
| 8 | Good | Good | JIS Class 1 | — | 690 × 1 |
| 9 | Good | Good | JIS Class 1 | — | 690 × 1 |
| 10 | Good | Good | JIS Class 1 | — | 690 × 1 |
| 11 | Good | Good | JIS Class 1 | — | 690 × 1 |
| 12 | Good | Good | JIS Class 1 | — | 690 × 1 |
| 13 | Good | Good | JIS Class 1 | — | 690 × 1 |
| 14 | Good | Good | JIS Class 1 | — | 690 × 1 |
| 15 | Good | Good | JIS Class 1 | — | 690 × 1 |

TABLE 25

| | Results of tensile test | | | Results of impact test | | | |
|---|---|---|---|---|---|---|---|
| No. | 0.2% proof stress (MPa) | Tensile strength (MPa) | Elongation (%) | Measured values (J) | | | Average (J) |
| Example No. | | | | | | | |
| 1 | 553 | 638 | 23 | 35 | 59 | 64 | 53 |
| 2 | 599 | 669 | 22 | 32 | 47 | 73 | 51 |
| 3 | 663 | 738 | 24 | 52 | 72 | 98 | 74 |
| 4 | 635 | 694 | 19 | 53 | 64 | 85 | 67 |
| 5 | 680 | 748 | 24 | 52 | 59 | 89 | 67 |
| 6 | 627 | 710 | 22 | 52 | 61 | 99 | 71 |
| 7 | 639 | 709 | 25 | 54 | 64 | 81 | 66 |
| 8 | 683 | 747 | 25 | 51 | 55 | 96 | 67 |
| 9 | 634 | 696 | 19 | 50 | 64 | 97 | 70 |
| 10 | 632 | 691 | 19 | 55 | 74 | 89 | 73 |
| 11 | 580 | 655 | 20 | 50 | 61 | 93 | 68 |
| 12 | 567 | 622 | 22 | 55 | 69 | 82 | 69 |
| 13 | 594 | 703 | 23 | 51 | 73 | 90 | 71 |
| 14 | 541 | 632 | 25 | 59 | 66 | 72 | 66 |
| 15 | 559 | 640 | 24 | 56 | 69 | 82 | 69 |

TABLE 26

| | Wire | | Composition of weld metal (mass %) | | | | | |
|---|---|---|---|---|---|---|---|---|
| No. | No. | Shielding gas | C | Si | Mn | P | S | Cu |
| Example No. | | | | | | | | |
| 16 | 16 | 100% $CO_2$ | 0.073 | 0.57 | 0.60 | 0.015 | 0.013 | 0.018 |
| 17 | 17 | 100% $CO_2$ | 0.075 | 0.59 | 0.45 | 0.015 | 0.013 | 0.018 |
| 18 | 18 | 100% $CO_2$ | 0.067 | 0.25 | 0.38 | 0.015 | 0.013 | 0.019 |
| 19 | 19 | 100% $CO_2$ | 0.131 | 0.28 | 0.56 | 0.016 | 0.013 | 0.019 |
| 20 | 20 | 80% Ar + 20% $CO_2$ | 0.041 | 0.37 | 0.92 | 0.009 | 0.010 | 0.016 |
| 21 | 21 | 100% $CO_2$ | 0.049 | 0.45 | 0.49 | 0.009 | 0.010 | 0.016 |
| 22 | 22 | 100% $CO_2$ | 0.035 | 0.41 | 0.61 | 0.007 | 0.012 | 0.018 |
| 23 | 23 | 100% $CO_2$ | 0.040 | 0.39 | 0.60 | 0.010 | 0.010 | 0.019 |
| 24 | 24 | 100% $CO_2$ | 0.063 | 0.30 | 0.68 | 0.015 | 0.013 | 0.019 |
| 25 | 25 | 100% $CO_2$ | 0.039 | 0.30 | 0.71 | 0.010 | 0.010 | 0.016 |
| 26 | 26 | 100% $CO_2$ | 0.034 | 0.40 | 0.62 | 0.006 | 0.012 | 0.018 |
| 27 | 27 | 100% $CO_2$ | 0.051 | 0.30 | 0.68 | 0.015 | 0.013 | 0.019 |
| 28 | 28 | 100% $CO_2$ | 0.027 | 0.30 | 0.70 | 0.009 | 0.010 | 0.016 |
| 29 | 29 | 100% $CO_2$ | 0.052 | 0.31 | 0.37 | 0.015 | 0.013 | 0.019 |
| 30 | 30 | 100% $CO_2$ | 0.027 | 0.31 | 0.39 | 0.010 | 0.010 | 0.016 |

TABLE 27

| | Composition of weld metal (mass %) | | | | | | | |
|---|---|---|---|---|---|---|---|---|
| No. | Ni | Cr | Mo | Ti | Nb | V | B | N |
| Example No. | | | | | | | | |
| 16 | 0.018 | 2.25 | 1.06 | 0.041 | 0.006 | 0.019 | 0.004 | 0.004 |
| 17 | 0.018 | 2.26 | 1.09 | 0.096 | 0.007 | 0.020 | 0.005 | 0.004 |
| 18 | 0.018 | 2.19 | 1.05 | 0.018 | 0.005 | 0.014 | 0.003 | 0.004 |
| 19 | 0.018 | 2.18 | 1.16 | 0.025 | 0.008 | 0.025 | 0.003 | 0.004 |
| 20 | 0.016 | 2.33 | 0.99 | 0.045 | 0.009 | 0.024 | 0.004 | 0.006 |
| 21 | 0.015 | 2.30 | 1.15 | 0.023 | 0.006 | 0.011 | 0.004 | 0.006 |
| 22 | 0.109 | 2.07 | 1.13 | 0.022 | 0.006 | 0.020 | 0.004 | 0.014 |
| 23 | 0.040 | 2.14 | 1.16 | 0.022 | 0.006 | 0.021 | 0.004 | 0.016 |
| 24 | 0.018 | 1.33 | 0.52 | 0.023 | 0.007 | 0.021 | 0.004 | 0.004 |
| 25 | 0.015 | 1.33 | 0.52 | 0.023 | 0.007 | 0.021 | 0.004 | 0.006 |
| 26 | 0.109 | 1.22 | 0.56 | 0.022 | 0.006 | 0.020 | 0.004 | 0.015 |
| 27 | 0.018 | 0.02 | 0.52 | 0.023 | 0.007 | 0.021 | <0.002 | 0.004 |
| 28 | 0.015 | 0.02 | 0.52 | 0.023 | 0.007 | 0.021 | <0.002 | 0.006 |
| 29 | 0.018 | 0.55 | 0.52 | 0.023 | 0.007 | 0.021 | <0.002 | 0.004 |
| 30 | 0.015 | 0.55 | 0.52 | 0.023 | 0.007 | 0.021 | <0.002 | 0.006 |

TABLE 28

| No. | Rating of welding maneuverability | Radiographic examination Rating | Note | Conditions of PWHT (° C. × hr, cooled in furnace) |
|---|---|---|---|---|
| Example No. | | | | |
| 16 | Good | Good | JIS Class 1 | — | 690 × 1 |
| 17 | Good | Good | JIS Class 1 | — | 690 × 1 |
| 18 | Good | Good | JIS Class 1 | — | 690 × 1 |
| 19 | Good | Good | JIS Class 1 | — | 690 × 1 |
| 20 | Good | Good | JIS Class 1 | — | 690 × 1 |
| 21 | Good | Good | JIS Class 1 | — | 690 × 1 |
| 22 | Good | Good | JIS Class 1 | — | 690 × 1 |
| 23 | Good | Good | JIS Class 1 | — | 690 × 1 |
| 24 | Good | Good | JIS Class 1 | — | 690 × 1 |
| 25 | Good | Good | JIS Class 1 | — | 690 × 1 |
| 26 | Good | Good | JIS Class 1 | — | 690 × 1 |
| 27 | Good | Good | JIS Class 1 | — | 690 × 1 |
| 28 | Good | Good | JIS Class 1 | — | 690 × 1 |
| 29 | Good | Good | JIS Class 1 | — | 690 × 1 |
| 30 | Good | Good | JIS Class 1 | — | 690 × 1 |

TABLE 29

| | Results of tensile test | | | Results of impact test | |
|---|---|---|---|---|---|
| | 0.2% proof stress (MPa) | Tensile strength (MPa) | Elongation (%) | Measured values (J) | Average (J) |
| Example No. | | | | | |
| 16 | 655 | 705 | 19 | 78 96 139 | 104 |
| 17 | 674 | 724 | 19 | 79 96 131 | 102 |
| 18 | 568 | 636 | 22 | 56 54 97 | 69 |
| 19 | 595 | 702 | 24 | 52 75 87 | 71 |
| 20 | 681 | 735 | 23 | 52 76 91 | 73 |
| 21 | 551 | 639 | 19 | 53 81 89 | 74 |
| 22 | 573 | 651 | 26 | 54 75 98 | 76 |
| 23 | 554 | 625 | 24 | 55 71 92 | 73 |
| 24 | 563 | 634 | 23 | 60 69 77 | 69 |
| 25 | 593 | 653 | 24 | 52 67 87 | 69 |
| 26 | 596 | 656 | 23 | 65 77 98 | 80 |
| 27 | 551 | 638 | 28 | 43 68 72 | 61 |
| 28 | 535 | 623 | 27 | 45 65 75 | 62 |
| 29 | 575 | 645 | 24 | 45 68 76 | 63 |
| 30 | 548 | 639 | 24 | 47 69 71 | 62 |

TABLE 30

| No. | Wire No. | Shielding gas | Composition of weld metal (mass %) | | | | | |
|---|---|---|---|---|---|---|---|---|
| | | | C | Si | Mn | P | S | Cu |
| Comparative Example No. | | | | | | | | |
| 54 | 31 | 100% $CO_2$ | 0.235 | 0.57 | 0.61 | 0.017 | 0.016 | 0.018 |
| 55 | 32 | 80% Ar + 20% $CO_2$ | 0.047 | 0.09 | 0.31 | 0.016 | 0.016 | 0.019 |
| 56 | 33 | 100% $CO_2$ | 0.037 | 0.79 | 0.39 | 0.017 | 0.016 | 0.018 |
| 57 | 34 | 80% Ar + 20% $CO_2$ | 0.064 | 0.71 | 0.29 | 0.017 | 0.015 | 0.019 |
| 58 | 35 | 100% $CO_2$ | 0.058 | 0.29 | 0.94 | 0.017 | 0.016 | 0.019 |
| 59 | 36 | 75% Ar + 25% $CO_2$ | 0.044 | 0.29 | 0.53 | 0.015 | 0.018 | 0.007 |
| 60 | 37 | 80% Ar + 20% $CO_2$ | 0.057 | 0.20 | 0.42 | 0.017 | 0.016 | 0.182 |
| 61 | 38 | 80% Ar + 20% $CO_2$ | 0.037 | 0.23 | 0.48 | 0.015 | 0.018 | 0.016 |
| 62 | 39 | 80% Ar + 20% $CO_2$ | 0.057 | 0.21 | 0.42 | 0.017 | 0.016 | 0.019 |
| 63 | 40 | 100% $CO_2$ | 0.085 | 0.20 | 0.65 | 0.017 | 0.015 | 0.018 |
| 64 | 41 | 100% $CO_2$ | 0.072 | 0.52 | 0.71 | 0.017 | 0.015 | 0.019 |
| 65 | 42 | 100% $CO_2$ | 0.036 | 0.29 | 0.48 | 0.017 | 0.016 | 0.019 |
| 66 | 43 | 100% $CO_2$ | 0.036 | 0.29 | 0.48 | 0.017 | 0.016 | 0.019 |

TABLE 30-continued

| | Wire | | Composition of weld metal (mass %) | | | | | |
|---|---|---|---|---|---|---|---|---|
| No. | No. | Shielding gas | C | Si | Mn | P | S | Cu |
| 67 | 44 | 100% $CO_2$ | 0.036 | 0.29 | 0.48 | 0.017 | 0.016 | 0.019 |
| 68 | 45 | 100% $CO_2$ | 0.038 | 0.55 | 0.75 | 0.017 | 0.015 | 0.018 |

TABLE 31

| | Composition of weld metal (mass %) | | | | | | | |
|---|---|---|---|---|---|---|---|---|
| No. | Ni | Cr | Mo | Ti | Nb | V | B | N |
| Comparative Example No. | | | | | | | | |
| 54 | 0.018 | 2.10 | 1.05 | 0.023 | <0.005 | <0.005 | <0.002 | 0.004 |
| 55 | 0.018 | 2.43 | 0.99 | 0.042 | <0.005 | <0.005 | <0.002 | 0.004 |
| 56 | 0.018 | 2.01 | 1.03 | 0.025 | <0.005 | <0.005 | <0.002 | 0.004 |
| 57 | 0.018 | 2.26 | 0.96 | 0.046 | <0.005 | <0.005 | <0.002 | 0.004 |
| 58 | 0.018 | 2.17 | 0.96 | 0.024 | <0.005 | <0.005 | <0.002 | 0.004 |
| 59 | 0.060 | 2.24 | 1.06 | 0.025 | <0.005 | <0.005 | <0.002 | 0.005 |
| 60 | 0.019 | 2.32 | 1.15 | 0.041 | <0.005 | <0.005 | <0.002 | 0.004 |
| 61 | 0.007 | 2.02 | 0.93 | 0.025 | <0.005 | <0.005 | <0.002 | 0.005 |
| 62 | 0.150 | 2.21 | 0.93 | 0.043 | <0.005 | <0.005 | <0.002 | 0.004 |
| 63 | 0.018 | 2.75 | 0.95 | 0.024 | <0.005 | <0.005 | <0.002 | 0.004 |
| 64 | 0.018 | 2.46 | 0.32 | 0.024 | <0.005 | <0.005 | <0.002 | 0.004 |
| 65 | 0.018 | 2.15 | 1.52 | 0.023 | <0.005 | <0.005 | <0.002 | 0.004 |
| 66 | 0.018 | 2.08 | 1.12 | 0.018 | <0.005 | <0.005 | <0.002 | 0.004 |
| 67 | 0.018 | 2.08 | 1.12 | 0.026 | <0.005 | <0.005 | <0.002 | 0.004 |
| 68 | 0.018 | 2.37 | 1.03 | 0.024 | <0.005 | <0.005 | <0.002 | 0.004 |

TABLE 32

| | Rating of welding | Radiographic examination | | Conditions of PWHT (° C. × hr, |
|---|---|---|---|---|
| No. | maneuverability | Rating | Note | cooled in furnace) |
| Comparative Example No. | | | | |
| 54 | Good | Poor | JIS Class 1 under | HC, BH | 690 × 1 |
| 55 | Poor | Poor | JIS Class 1 under | BH | 690 × 1 |
| 56 | Poor | Good | JIS Class 1 | — | 690 × 1 |
| 57 | Poor | Poor | JIS Class 1 under | BH | 690 × 1 |
| 58 | Poor | Good | JIS Class 1 | — | 690 × 1 |
| 59 | Good | Good | JIS Class 1 | — | 690 × 1 |
| 60 | Good | Good | JIS Class 1 | — | 690 × 1 |
| 61 | Good | Good | JIS Class 1 | — | 690 × 1 |
| 62 | Good | Good | JIS Class 1 | — | 690 × 1 |
| 63 | Good | Good | JIS Class 1 | — | 690 × 1 |
| 64 | Good | Good | JIS Class 1 | — | 690 × 1 |
| 65 | Good | Good | JIS Class 1 | — | 690 × 1 |
| 66 | Poor | Good | JIS Class 1 | — | 690 × 1 |
| 67 | Poor | Poor | JIS Class 1 under | S1 | 690 × 1 |
| 68 | Poor | Poor | JIS Class 1 under | BH | 690 × 1 |

TABLE 33

| | Results of tensile test | | | Results of impact test | | | |
|---|---|---|---|---|---|---|---|
| No. | 0.2% proof stress (MPa) | Tensile strength (MPa) | Elongation (%) | Measured values (J) | | | Average (J) |
| Comparative Example No. | | | | | | | |
| 54 | Not evaluated | | | Not evaluated | | | — |
| 55 | 530 | 603 | 21 | 7 | 18 | 25 | 17 |
| 56 | 586 | 645 | 17 | 7 | 8 | 8 | 8 |
| 57 | 535 | 629 | 20 | 12 | 18 | 21 | 17 |
| 58 | 558 | 662 | 23 | 32 | 42 | 63 | 46 |
| 59 | 585 | 672 | 21 | 7 | 15 | 68 | 30 |
| 60 | 534 | 615 | 19 | 28 | 34 | 69 | 44 |
| 61 | 552 | 642 | 23 | 6 | 12 | 60 | 26 |
| 62 | 535 | 618 | 24 | 28 | 28 | 61 | 39 |
| 63 | 699 | 773 | 16 | 9 | 10 | 13 | 11 |
| 64 | 533 | 615 | 16 | 16 | 19 | 23 | 19 |
| 65 | 683 | 765 | 15 | 17 | 21 | 23 | 20 |
| 66 | 598 | 663 | 22 | 47 | 59 | 76 | 61 |
| 67 | 560 | 639 | 17 | 32 | 61 | 75 | 56 |
| 68 | 578 | 643 | 22 | 7 | 7 | 11 | 8 |

TABLE 34

| No. | Wire No. | Shielding gas | Composition of weld metal (mass %) | | | | | |
|---|---|---|---|---|---|---|---|---|
| | | | C | Si | Mn | P | S | Cu |
| Comparative Example No. | | | | | | | | |
| 69 | 46 | 100% $CO_2$ | 0.083 | 0.26 | 0.49 | 0.017 | 0.015 | 0.018 |
| 70 | 47 | 100% $CO_2$ | 0.071 | 0.38 | 0.38 | 0.017 | 0.015 | 0.018 |
| 71 | 48 | 100% $CO_2$ | 0.071 | 0.38 | 0.38 | 0.017 | 0.015 | 0.018 |
| 72 | 49 | 75% Ar + 25% $CO_2$ | 0.083 | 0.24 | 0.44 | 0.017 | 0.016 | 0.019 |
| 73 | 50 | 100% $CO_2$ | 0.075 | 0.34 | 0.42 | 0.017 | 0.016 | 0.018 |
| 74 | 51 | 100% $CO_2$ | 0.042 | 0.02 | 0.28 | 0.016 | 0.016 | 0.019 |
| 75 | 52 | 100% $CO_2$ | 0.036 | 0.15 | 0.48 | 0.017 | 0.016 | 0.019 |
| 76 | 53 | 100% $CO_2$ | 0.068 | 0.02 | 0.28 | 0.017 | 0.016 | 0.019 |
| 77 | 54 | 100% $CO_2$ | 0.075 | 0.34 | 0.42 | 0.017 | 0.016 | 0.018 |
| 78 | 55 | 100% $CO_2$ | 0.036 | 0.80 | 0.25 | 0.017 | 0.016 | 0.018 |

TABLE 35

| | Composition of weld metal (mass %) | | | | | | | |
|---|---|---|---|---|---|---|---|---|
| No. | Ni | Cr | Mo | Ti | Nb | V | B | N |
| Comparative Example No. | | | | | | | | |
| 69 | 0.018 | 2.14 | 1.00 | 0.023 | <0.005 | <0.005 | <0.002 | 0.004 |
| 70 | 0.018 | 2.14 | 1.00 | 0.024 | <0.005 | <0.005 | <0.002 | 0.004 |
| 71 | 0.018 | 2.14 | 1.00 | 0.024 | <0.005 | <0.005 | <0.002 | 0.004 |
| 72 | 0.018 | 2.34 | 1.02 | 0.043 | <0.005 | <0.005 | <0.002 | 0.004 |
| 73 | 0.018 | 2.15 | 1.11 | 0.025 | <0.005 | <0.005 | <0.002 | 0.004 |
| 74 | 0.018 | 2.24 | 1.00 | 0.020 | <0.005 | <0.005 | <0.002 | 0.004 |
| 75 | 0.018 | 2.09 | 1.12 | 0.018 | <0.005 | <0.005 | <0.002 | 0.004 |
| 76 | 0.018 | 2.09 | 0.96 | 0.020 | <0.005 | <0.005 | <0.002 | 0.004 |
| 77 | 0.018 | 2.15 | 1.11 | 0.018 | <0.005 | <0.005 | <0.002 | 0.004 |
| 78 | 0.018 | 2.08 | 1.03 | 0.025 | <0.005 | <0.005 | <0.002 | 0.004 |

TABLE 36

| No. | Rating of welding maneuver-ability | Radiographic examination Rating | Note | Conditions of PWHT (° C. × hr, cooled in furnace) |
|---|---|---|---|---|
| Comparative Example No. | | | | |
| 69 | Poor | Good | JIS Class 1 | — | 690 × 1 |
| 70 | Poor | Poor | JIS Class 1 under | BH, SI | 690 × 1 |
| 71 | Poor | Good | JIS Class 1 | — | 690 × 1 |
| 72 | Poor | Poor | JIS Class 1 under | SI | 690 × 1 |
| 73 | Poor | Poor | JIS Class 1 under | SI | 690 × 1 |
| 74 | Poor | Poor | JIS Class 1 under | BH | 690 × 1 |
| 75 | Poor | Good | JIS Class 1 | — | 690 × 1 |
| 76 | Poor | Poor | JIS Class 1 under | BH, SI | 690 × 1 |
| 77 | Poor | Poor | JIS Class 1 under | SI | 690 × 1 |
| 78 | Poor | Poor | JIS Class 1 under | BH | 690 × 1 |

TABLE 37

| | Results of tensile test | | | Results of impact test | | | |
|---|---|---|---|---|---|---|---|
| No. | 0.2% proof stress (MPa) | Tensile strength (MPa) | Elongation (%) | Measured values (J) | | | Average (J) |
| Comparative Example No. | | | | | | | |
| 69 | 564 | 638 | 23 | 45 | 59 | 93 | 66 |
| 70 | 572 | 648 | 23 | 11 | 18 | 18 | 16 |
| 71 | 578 | 645 | 23 | 82 | 49 | 65 | 49 |
| 72 | 635 | 715 | 22 | 29 | 42 | 61 | 44 |
| 73 | 625 | 703 | 21 | 32 | 49 | 58 | 46 |
| 74 | 528 | 625 | 13 | 7 | 7 | 9 | 8 |
| 75 | 560 | 652 | 22 | 29 | 31 | 45 | 35 |
| 76 | 531 | 607 | 11 | 10 | 12 | 15 | 12 |
| 77 | 608 | 675 | 22 | 34 | 42 | 42 | 39 |
| 78 | 521 | 608 | 11 | 6 | 7 | 9 | 7 |

As Tables 22 to 37 above show, those samples in Examles 1 to 30 contain as much slag-forming agent, C, Si, Mn, Cu, Ni, Cr, Mo, $TiO_2$, metal fluoride, and Mg as specified in Claim 1. Therefore, they are superior in welding maneuverability, radiographic examination, tensile properties, and impact properties, and they meet the requirements for acceptance as shown in Table 21. Samples in Examples 3 to 30 contain P and S in an amount less than 0.015 mass %; samples in Examples 3 to 26 contain B in an amount of 0.05–0,020 mass %; and samples in Examples 16 and 17 contain Ti in an amount of 0.0002–0.3 mass %. These samples are classified into the following four groups.

Group (1): Wire Nos. 1 and 2 (P and S not limited, B not added, Ti not added)
Group (2): Wire Nos. 27 to 30 (P and S limited, B not added, Ti not added)
Group (3): Wire Nos. 3 to 26 (P and S limited, B added, Ti not added)
Group (4): Wire Nos. 16 and 17 (P and S limited, B added, Ti added)

It was found that samples vary in impact values from one group to another in the order of (1)<(2)≦(3)<(4). In other words, samples in Examples 16 and 17 (as specified in Claim 3) have the best characteristics.

On the other hand, sample No. 54 (in Comparative Example) contains C in an amount exceeding the upper limit specified in the present inventio n and hence it suffered hot cracking and blowhole in weld metal on account of C although it keeps its welding maneuverability unaffected. This hot cracking was long enough to be visible immediately after welding. Therefore, this sample underwent only radiographic examination but did not undergo tensile test and impact test.

Sample No. 55 (in Comparative Example) contains Si in an amount less than the lower limit specified in the invention; therefore, it gave weld metal having insufficient viscosity which in turn resulted in a bead with an undesirable convex shape in the case of vertical welding. Moreover, it suffered blowhole due to insufficient deoxidation and hence the resulting weld metal had tensile properties and impact properties which do not meet the requirements for acceptance (as shown Table 21). Sample No. 56 (in Comparative Example) contains Si in an amount more than the upper limit specified in the invention; therefore, it gave weld metal having insufficient viscosity which in turn resulted in a bead with an undesirable convex shape in the case of vertical welding. On the other hand, weld metal had no weld defects detectable by radiographic examination but it became brittle after PWHT and hence it gave impact properties which do not meet the requirements for acceptance (as shown Table 21).

Sample No. 57 (in Comparative Example) contains Mn in an amount less than the lower limit specified in the invention; therefore, it gave weld metal which resulted in a bead with an undesirable convex shape in the case of vertical welding. In addition, it gave weld metal which suffered blowhole and failed radiographic examination due to insufficient deoxidation and which had tensile properties and impact properties which do not meet the requirements for acceptance (as shown Table 21). Sample No. 58 (in Comparative Example) contains Mn in an amount more than the upper limit specified in the invention; therefore, it gave weld metal having excessive fluidity which resulted in a bead with an undesirable convex shape in the case of vertical welding. In addition, it gave weld metal which passed radiographic examination and had tensile properties and impact properties which meet the requirements for acceptance (as shown Table 21).

Sample No. 59 (in Comparative Example) contains Cu in an amount less than the lower limit specified in the invention. Therefore, it gave weld metal which greatly varied in impact properties and lacked stability in impact properties, although it posed no problems with welding maneuverability and radiographic examination. Sample No. 60 (in Comparative Example) contains Cu in an amount more than the upper limit specified in the invention. Therefore, it gave weld metal which had tensile properties not meeting the requirements for acceptance (as shown Table 21), although it gave weld metal having no problems with impact properties.

Sample No. 61 (in Comparative Example) contains Ni in an amount less than the lower limit specified in the invention. Therefore, it gave weld metal which greatly varied in impact properties and lacked stability in impact properties. Sample No. 62 (in Comparative Example) contains Ni in an amount more than the upper limit specified in the invention. Therefore, it gave weld metal which had tensile properties not meeting the requirements for acceptance (as shown Table 21), although it posed no problems with welding maneuverability, impact properties, and radiographic examination.

Sample No. 63 (in Comparative Example) contains Cr in an amount more than the upper limit specified in the invention. Therefore, it gave weld metal which had excessively high strength not meeting the requirements for acceptance (as shown Table 21). In addition, it gave weld metal which had poor toughness due to embrittlement, although it posed no problems with welding maneuverability and radiographic examination.

Sample No. 64 (in Comparative Example) contains Mo in an amount less than the lower limit specified in the invention. Therefore, it gave weld metal which had tensile properties and impact properties not meeting the requirements for acceptance (as shown Table 21), although it posed no problems with welding maneuverability and radiographic examination. Sample No. 65 (in Comparative Example) contains Mo in an amount more than the upper limit specified in the invention. Therefore, it gave weld metal which had excessively high strength not meeting the requirements for acceptance (as shown Table 21). In addition, it gave weld metal which had poor toughness due to embrittlement, although it posed no problems with welding maneuverability and radiographic examination.

Sample No. 66 (in Comparative Example) contains $TiO_2$ in an amount less than the lower limit specified in the invention. Therefore, it caused poor arc stability and much spatter, giving a convex bead in the case of vertical welding, although it posed no problems with welding maneuverability and radiographic examination. Sample No. 67 (in Comparative Example) contains $TiO_2$ in an amount more than the upper limit specified in the invention. Therefore, it gave a convex bead in the case of vertical welding and caused slag inclusion and the result of radiographic examination was poor.

Sample No. 68 (in Comparative Example) contains Mg in an amount less than the lower limit specified in the invention. Therefore, it gave a convex bead in the case of vertical welding. In addition, it gave weld metal which suffered blowhole on account of insufficient deoxidation and hence was poor in the results of radiographic examination. It gave weld metal which had impact properties not meeting the requirements for acceptance as shown in Table 21.

Sample No. 69 (in Comparative Example) contains Mg in an amount more than the upper limit specified in the invention. Therefore, it caused a large amount of spatter and gave a convex bead in the case of vertical welding because of weld metal having excessive fluidity, although it posed no problems with tensile properties and impact properties.

Sample No. 70 (in Comparative Example) contains fluorides (in terms of F) in an amount less than the lower limit specified in the invention. Therefore, it was poor in arc stability and caused a convex bead in the case of vertical welding because it was unable to control the viscosity of molten slag. It did not permit slag to float on and separate from molten metal and hence it gave weld metal which had impact properties not meeting the requirements for acceptance as shown in Table 21 on account of insufficient deoxidation. In addition, it caused blowhole and slag inclusion and poor results in radiographic examination, although it posed no problems with tensile properties.

Sample No. 71 (in Comparative Example) contains fluorides (in terms of F) in an amount more than the upper limit specified in the invention. Therefore, it gave excessive fluid flag which in turn causes a convex bead in the case of vertical welding, although it caused no problems with tensile properties and impact properties and the results of radiographic examination.

Sample No. 72 (in Comparative Example) contains the slag-forming agent in an amount less than the lower limit specified in the invention. Therefore, it gave a poor-looking bead and a convex bead on account of insufficient slag in the case of vertical welding. It also gave weld metal which was poor in slag removability and suffered partial burn-on. Thus, the resulting weld metal caused slag inclusion and gave poor results in radiographic examination, although it posed no problems with tensile properties and impact properties.

Sample No. 73 (in Comparative Example) contains the slag-forming agent in an amount more than the lower limit specified in the invention. Therefore, it gave a convex bead in the case of vertical welding. It also gave weld metal which was invariably covered by slag during welding and hence caused slag inclusion and gave poor results in radiographic examination, although it posed no problems with tensile properties and impact properties.

Sample No. 74 (in Comparative Example) contains both Si and Mn in an amount less than the lower limit specified in the invention. Therefore, it gave a convex bead. In addition, it gave weld metal which suffered blowhole on account of insufficient deoxidation and hence was poor in the results of radiographic examination. It gave weld metal which had tensile and impact properties not meeting the requirements for acceptance as shown in Table 21.

Sample No. 75 (in Comparative Example) contains $TiO_2$ in an amount less than the upper limit specified in the invention and also contains fluorides in an amount more than the upper limit specified in the invention. Therefore, it caused a large amount of spatter and gave a convex bead in the case of vertical welding, although it posed no problems with tensile properties and impact properties and the results of radiographic examination.

Sample No. 76 (in Comparative Example) contains both Si and Mn in an amount less than the lower limit specified in the invention. Therefore, it gave a convex bead in the case of vertical welding on account of molten metal having insufficient viscosity. It also gave weld metal which was poor in slag removability and suffered partial burn-on and slag inclusion. Thus, the resulting weld metal was poor in the results of radiographic examination and suffered blowhole due to insufficient deoxidation. The resulting weld metal did not meet the requirements for tensile properties and impact properties required for acceptance specified in Table 21.

Sample No. 77 (in Comparative Example) contains the slag-forming agent in an amount more than the upper limit specified in the invention and also contains $TiO_2$ in an amount less than the lower limit specified in the invention. Therefore, it caused poor arc stability and much spatter, giving a convex bead in the case of vertical welding, and gave rise to an excessive amount of slag which preceded weld metal during welding, causing slag inclusion. The results of radiographic examination was poor.

Sample No. 78 (in Comparative Example) contains Si in an amount more than the upper limit specified in the invention and also contains Mn in an amount less than the lower limit specified in the invention. Therefore, it gave a convex bead in the case of vertical welding. The resulting weld metal suffered remarkable embrittlement and hence was poor in impact properties on account of excessive Si. Moreover, the resulting weld metal suffered blowhole due to insufficient Mn content and hence insufficient deoxidation. The weld metal was poor in the results of radiographic examination and has tensile properties and impact properties not meeting the requirements for acceptance specified in Table 21.

Example 2

Test plates as shown in FIG. 1 were prepared in the same way as in Example 1 by using the flux-cored wires numbered 1 to 23 in Example 1. They underwent PWHT and then examination for ferrite band and tensile and impact tests. PWHT consisted of keeping the sample at 690° C. for 19 hours and cooling it in a furnace. Tensile and impact tests were the same as those in Example 1.

Examination for ferrite band was carried out in the following way. After PWHT, the weld metal of the sample was cut at equal intervals perpendicular to the weld line so as to take six specimens for observation of sectional microstructure. The specimen, with its surface polished and etched, was inspected under an optical microscope for ferrite band. The sample was rated according to the ratio of occurrence of ferrite band (segregation) calculated by the following formula.

Ratio of occurrence=(Number of cross sections in which ferrite band occurred)/6

The sample was regarded as acceptable if the ratio of occurrence is less than 33%; otherwise, it was regarded as rejectable. The results are shown in Tables 38 to 41.

TABLE 38

| No. | Wire No. | Shielding gas | PWHT (° C. × hours, cooled in furnace) | Ferrite band Rating | Ratio of occurrence |
|---|---|---|---|---|---|
| Example No. | | | | | |
| 31 | 1 | 100% $CO_2$ | 690 × 19 | Acceptable | 16% |
| 32 | 2 | 100% $CO_2$ | 690 × 19 | Acceptable | 16% |
| 33 | 3 | 80% Ar + 20% $CO_2$ | 690 × 19 | Acceptable | Not occurred |
| 34 | 4 | 100% $CO_2$ | 690 × 19 | Acceptable | Not occurred |
| 35 | 5 | 75% Ar + 25% $CO_2$ | 690 × 19 | Acceptable | Not occurred |
| 36 | 6 | 75% Ar + 25% $CO_2$ | 690 × 19 | Acceptable | Not occurred |
| 37 | 7 | 80% Ar + 20% $CO_2$ | 690 × 19 | Acceptable | Not occurred |
| 38 | 8 | 80% Ar + 20% $CO_2$ | 690 × 19 | Acceptable | Not occurred |
| 39 | 9 | 100% $CO_2$ | 690 × 19 | Acceptable | Not occurred |
| 40 | 10 | 100% $CO_2$ | 690 × 19 | Acceptable | Not occurred |
| 41 | 11 | 100% $CO_2$ | 690 × 19 | Acceptable | Not occurred |
| 42 | 12 | 100% $CO_2$ | 690 × 19 | Acceptable | Not occurred |
| 43 | 13 | 100% $CO_2$ | 690 × 19 | Acceptable | Not occurred |
| 44 | 14 | 100% $CO_2$ | 690 × 19 | Acceptable | Not occurred |
| 45 | 15 | 100% $CO_2$ | 690 × 19 | Acceptable | Not occurred |

TABLE 39

| No. | Results of tensile test | | | Results of impact test | | |
|---|---|---|---|---|---|---|
| | 0.2% proof stress (MPa) | Tensile strength (MPa) | Elongation (%) | Measured values (J) | | Average (J) |
| Example No. | | | | | | |
| 31 | 463 | 545 | 20 | 65 | 75 | 79 | 73 |
| 32 | 502 | 571 | 19 | 65 | 78 | 92 | 78 |
| 33 | 555 | 630 | 21 | 69 | 98 | 102 | 90 |
| 34 | 532 | 593 | 17 | 74 | 76 | 105 | 85 |
| 35 | 570 | 639 | 21 | 60 | 75 | 110 | 82 |
| 36 | 525 | 606 | 19 | 65 | 97 | 107 | 90 |
| 37 | 535 | 606 | 22 | 65 | 78 | 102 | 82 |
| 38 | 572 | 638 | 22 | 68 | 88 | 110 | 89 |
| 39 | 531 | 594 | 17 | 61 | 97 | 115 | 91 |
| 40 | 529 | 591 | 17 | 63 | 98 | 114 | 92 |
| 41 | 486 | 559 | 18 | 67 | 82 | 93 | 81 |
| 42 | 475 | 531 | 19 | 67 | 87 | 105 | 86 |
| 43 | 498 | 600 | 20 | 72 | 82 | 118 | 91 |

TABLE 39-continued

| | | Results of tensile test | | | | | |
|---|---|---|---|---|---|---|---|
| No. | 0.2% proof stress (MPa) | Tensile strength (MPa) | Elongation (%) | Results of impact test | | | |
| | | | | Measured values (J) | | | Average (J) |
| 44 | 453 | 540 | 22 | 73 | 89 | 109 | 90 |
| 45 | 468 | 547 | 21 | 65 | 81 | 105 | 84 |

TABLE 40

| No. | Wire No. | Shielding gas | PWHT (° C. × hours, cooled in furnace) | Rating | Ferrite band Ratio of occurrence |
|---|---|---|---|---|---|
| Example No. | | | | | |
| 46 | 16 | 100% $CO_2$ | 690 × 19 | Acceptable | Not occurred |
| 47 | 17 | 100% $CO_2$ | 690 × 19 | Acceptable | Not occurred |
| 48 | 18 | 100% $CO_2$ | 690 × 19 | Acceptable | Not occurred |
| 49 | 19 | 100% $CO_2$ | 690 × 19 | Acceptable | Not occurred |
| 50 | 20 | 80% Ar + 20% $CO_2$ | 690 × 19 | Acceptable | Not occurred |
| 51 | 21 | 100% $CO_2$ | 690 × 19 | Acceptable | Not occurred |
| 52 | 22 | 100% $CO_2$ | 690 × 19 | Acceptable | Not occurred |
| 53 | 23 | 100% $CO_2$ | 690 × 19 | Acceptable | Not occurred |

TABLE 41

| | Results of tensile test | | | | | | |
|---|---|---|---|---|---|---|---|
| | 0.2% proof stress (MPa) | Tensile strength (MPa) | Elongation (%) | Results of impact test | | | |
| | | | | Measured values (J) | | | Average (J) |
| Example No. | | | | | | | |
| 46 | 549 | 602 | 17 | 105 | 129 | 145 | 126 |
| 47 | 565 | 618 | 17 | 100 | 125 | 138 | 121 |
| 48 | 476 | 543 | 19 | 91 | 99 | 105 | 98 |
| 49 | 498 | 600 | 21 | 78 | 89 | 110 | 92 |
| 50 | 570 | 628 | 20 | 67 | 102 | 113 | 74 |
| 51 | 462 | 546 | 17 | 67 | 112 | 112 | 97 |
| 52 | 480 | 556 | 23 | 62 | 85 | 112 | 86 |
| 53 | 464 | 534 | 21 | 65 | 105 | 110 | 93 |

As Tables 38 to 41 above show, samples Nos. 31 to 53 in Example had the occurrence of ferrite bands within acceptable limits. Particularly, samples Nos. 33 to 53 incorporated with Nb and V had no occurrence of ferrite bands, indicating their stable microstructure as well as stable tensile and impact properties.

[Effect of the invention] As mentioned above, the flux-cored wire of the present invention has both good welding maneuverability and ability to give weld metal with good mechanical properties (such as strength and toughness) because of the specific composition and content of the additives added to either or both of its metal tube and flux.

What is claimed is:

1. A flux-cored wire for gas-shielded arc welding of heat-resisting steel in the form of a steel tube filled with a flux, which is characterized in that the content of slag-forming agent is 6.10–9.90 mass % (based on the total mass of the wire), said steel tube and said flux all together contain less than 0.20 mass % C, 0.06–1.40 mass % Si, 0.55–1.60 mass % Mn, 0.004–0.090 mass % Cu, 0.004–0.090 mass % Ni, less than 2.60 mass % Cr, and 0.3–1.20 mass % Mo (based on the total mass of the wire), and said flux contains 4.2–8.2 mass % $TiO_2$, 0.025–0.25 mass % of metal fluoride (in terms of fluorine), and 0.20–1.50 mass % Mg.

2. A flux-cored wire for gas-shielded arc welding of heat-resisting steel as defined in claim 1, wherein said steel tube and said flux all together further contain 0.005–0.050 mass % Nb, 0.005–0.050 mass % V, and 0.005–0.020 mass % B (based on the total mass of the wire), and said steel tube and said flux contain less than 0.015 mass % P and less than 0.015 mass % S.

3. A flux-cored wire for gas-shielded arc welding of heat-resisting steel as defined in claim 1, wherein said steel tube and said flux all together further contain 0.02–0.2 mass % Ti (based on the total mass of the wire).

* * * * *